3,728,151
FIBER AND FABRIC TREATING
Patsy O. Sherman, Bloomington, and Samuel Smith, Roseville, Minn., assignors to Minnesota Mining and Manufacturing Company, St. Paul, Minn.
Application Jan. 15, 1968, Ser. No. 698,016, which is a continuation-in-part of abandoned application Ser. No. 614,925, Feb. 9, 1967. Divided and this application June 17, 1970, Ser. No. 57,884
Int. Cl. B44d 1/22
U.S. Cl. 117—138.8 A
11 Claims

ABSTRACT OF THE DISCLOSURE

Hybrid polymers provide sufficient oleophobicity and hydrophilicity in water so that fabrics treated therewith have increased ability to release oily stains on laundering. Oleophobic and hydrophilic moieties are combined in coatable copolymers so that the relative mobility of the moieties is assumed under some set of conditions of temperature and environment. Surfaces treated with the resulting copolymers respond reversibly to changes of environment, e.g. gaseous to aqueous milieu and vice versa, by a change in kind of properties. As a non-limiting example, fluorochemical moieties and hydrophilic polyether moieties are combined through sulfur atoms to give polymers which are applied as oil and water-repellent treatments with other, e.g. crease resistant, textile treatments. Fabrics thus treated are repeatedly launderable to remove oily stains.

---

Figure 1:
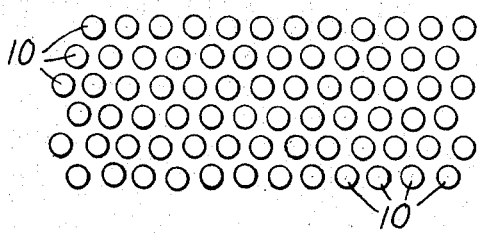

This application is a division of our copending application Ser. No. 698,016, filed Jan. 15, 1968, issued as U.S. Pat. 3,574,791 on Apr. 13, 1971 which is a continuation-in-part of our copending application Ser. No. 614,925 filed Feb. 9, 1967 now abandoned.

This invention relates to polymeric materials of hybrid nature having structures permitting auto-adaptation to environmental conditions and to such polymers adapted to conferring desirable properties on surfaces relative to essentially aqueous and to essentially dry environments. Such surfaces may be those of fibers forming fabrics. This invention thus relates to treated fabrics possessing improved properties and particularly having resistance to oily staining, which resistance is largely retained after laundering, as well as after dry-cleaning, and is coupled with enhanced ease of release of stains which may penetrate the treatments. Resin treatments broadly increase oleophilicity and hence tend to be retentive of oily stains. The invention further relates to fabrics having increased ease of oily stain removal on laundering. This invention further relates to compositions yielding such fabrics and to processes for producing such fabrics. In one preferred embodiment the invention relates to treated fabrics of natural and/or synthetic fibers possessing the above described improved properties with respect to staining in combination with properties enhanced by other known treatments to improve hand, crease resistance, drape, and the like properties. In another preferred embodiment the invention relates to processes for enhancing cleanability of fabrics.

The compositions employed in this invention possess remarkable characteristics in that when applied to a substrate (e.g. fabric, including fabrics having resin treatments and as observed in air) they confer on that substrate oleophobic properties and in many instances also hydrophobic properties which persist through repeated launderings (and generally also dry-cleanings) and permit easy removal of oily stains by laundering. Hybrid polymeric materials confer the ability to release oily stains under laundering conditions on otherwise oleophilic synthetic and modified cellulosic fibers. The manner in which hybrid copolymers are believed to provide the above novel properties is illustrated for one class of copolymers in the drawings as described hereinbelow. Previous hydrophobic and oleophobic treatments either were nondurable or, if durable, retained oily strains tenaciously on laundering.

It is almost routine to finish or treat textiles of various kinds to enhance desirable properties and characteristics and minimize undesirable properties. Many such treatments increase oleophilicity. Although synthetic fabrics including "blends" have good strength, resistance to abrasion, and resilience which allows shape retention, they are usually treated with finishing agents such as softeners to give them a better "hand" or feel. The natural fabrics such as cotton frequently have good "hand" properties but are often treated to give the fabrics increased fiber-resilience and crease-resistance.

Fabrics are often treated with thermosetting organic resins to give them "wash and wear" and permanent press characteristics, particularly the cotton-containing fabrics which without such treatment wrinkle badly when worn or as a result of laundering. Fabrics treated with thermosetting resins, cured and then cut into garments provide "wash and wear" characteristics; if the cure is deferred until after cutting of the garment, "permanent press" fabrics are obtained. In addition to the thermosetting resin, catalysts to promote the crosslinking reaction thereof are required, and as above indicated various modifying additives or finishing agents such as softeners, stiffeners, etc. are also usually used in addition to the thermosetting resin to provide a suitable commercial fabric.

The combination of treating and/or finishing agents results in a fabric with good wearing characteristics. However, the tendency of the fiber to accept oily stains is generally somewhat increased and the ability of the material to release such stains upon laundering is usually markedly reduced. The fabric has become significantly oleophilic. Furthermore "wicking" of the stain or diffusing into the bulk of the fabric may make the stain difficult to remove after a few days time. Fluorochemical treating agents are available to improve the resistance to staining, by providing oil repellency and water repellency. However, the ability of the material to release stains, particularly oil stains, is further inhibited by such prior art fluorochemical treating agents. Oily stains occur, depsite the treatment, because oil or oily materials are forced into the fabric, usually as the result of pressure and prolonged contact. The most serious defect presently observed in wash and wear and permanent press fabrics is the "permanently stained" nature of such garments after a few wearings. Such stains may be removable by dry cleaning but, for many garments such as shirts, children's clothing, and slacks, dry cleaning is impractical and undesirable.

It is a broad aim of this invention to provide compositions and processes to enhance cleanability of polymer-treated fibers and fabrics.

A series of reports on wet soiling of cotton, which is related to the removal of oily stains, published in the Textile Research Journal, vol. 33, pp. 137–145 (1963), vol. 34, pp. 29–34, 844–849 (1964) and vol. 35, 252–260 (1965) by Berch, Peper and Draper closes with the statement that finishing agents which are more hydrophobic than cellulose make oily soil removal more difficult than from untreated cotton and that this inherent disadvantage must be weighed against the advantages of stain and water repellency in air. It was shown that this effect was essentially the thermodynamic consequence of the compositions available and their behavior in the detergent solutions used in attempting to remove oily stains and/or soil by laundering.

An object of the invention is to provide fabrics having enhanced ease of oily stain release on laundering. It is another object of the this invention to provide compositions displaying oleophobic properties under atmospheric conditions and hydrophilic and oleophobic properties in aqueous milieux. It is a further object of this invention to provide compositions displaying oleophobic and hydrophobic properties under atmospheric conditions and hydrophilic and oleophobic properties in aqueous milieux. A further object of the invention is to provide textile treating agents which confer hydrophobicity and oleophobicity under conditions of normal wear, are stable to and durable after repeated launderings and release oily stains and/or soil during laundering of the treated fabric. A further object of the invention is to provide oil and water repellent treatments, for fabrics, which do not hinder stain release on laundering and which are generally without significant detrimental effect on hand, crease-resistance and other properties additionally imparted to the tread fabric. Yet another object of the invention is to provide a process for rendering fabrics oil and water resistant and launderable to a clean state by release of oily stains and/or soil. A still further object of the invention is to provide fabrics which are cleanable by laundering and yet are oil and water resistant in normal use. Other objects will become evident from our disclosure.

In discussing oleophobicity, hydrophobicity, oleophilicity and hydrophilicity, one must understand that the terms are not absolute in meaning. Thus several fabrics may possess oleophobicity in different degrees. Treated fabrics may be compared with respect to all of these properties and have certain properties to useful extents, although essentially lacking other properties. The release of oily stains from a treated fabric on laundering requires a considerable degree of hydrophilicity in water. A net or resultant oleophobicity under laundering conditions is also needed. It is not essential that the treated fabric also be strongly or durably oleophobic and/or hydrophobic in air for the treatment to be useful; although it must be more so than untreated fabric.

In accordance with the above and other objects of the invention, novel polymers are provided which are coatable on surfaces to form layers or other modified surface having oleophobic and hydrophobic characteristics in an air atmosphere and possessing oleophobic and hydrophilic characteristics in aqueous milieu. When this class of polymers is used to treat a fabric, the fabric is rendered oil and water repellent in an atmospheric environment and on the other hand when the fabric is laundered in water, it becomes hydrophilic and the removal of oily stains from the fabric is made possible.

The change from oleophobicity and hydrophobicity in air to net oleophobicity and hydrophilicity in water is termed autoadaptibility.

To possess characteristics of autoadaptibility as here contemplated, polymers normally comprise segments of two different types, namely fluorinated segments and hydrophilic segments which are conveniently designated as "F" segments and "H" segments respectively and interconnecting structure between segments. These are typified by their structure.

An "F" segment is a portion of the polymer which includes a multiplicity of highly fluorinated aliphatic radicals and the intraconnecting structure therebetween but is substantially free from hydrophilic groups. Correspondingly an "H" segment is a portion of the polymer which includes a multiplicity of polar groups and their intraconnecting structure substantially free from fluorinated aliphatic groups.

It will be evident that a polymer may include portions of its interconnecting structure which are neither "F" nor "H" segments. Furthermore, it will be apparent that the intraconnecting structure within the segments may not be entirely free from either fluorinated aliphatic or polar groups. It is only necessary to recognize that polymers having "F" segments and "H" segments may be formed under a wide variey of conditions and processes and hence segments may and do occur in a large group of copolymers. It is preferred that the structure be of the types known as block or graft copolymers. It is generally preferred that the interconnecting structure constitute not more than about 50% of the copolymer by weight and still more preferred that it not constitute more than 25% thereof.

It is further preferred that each "F" segment contain two or more pendent groups ("F" occurrence) terminating in highly fluorinated aliphatic groups. In the copolymer as a whole it is preferred that every pendent group of this fluorinated aliphatic type be associated with at least one other such group to form a segment. If some pendent groups of the fluorinated aliphatic type are not associated in segments, i.e., are solitary "F" occurrences it is preferred that the number thereof be at least equalled by the number of segments containing three or more pendent groups so that the average number of pendent fluorinated aliphatic groups per "F" occurrence is two or more. Thus, there should be at least twice as many pendent groups as the number of solitary groups and segments combined.

Likewise for the polar groups it is preferred that all be associated in groups of two or more, i.e. as segments. When any are solitary, "H" occurrence, it is preferred that the number thereof be more than equalled by the number of segments containing three or more polar groups. The average number based on all occurrences will thus be more than two.

It is generally preferred that the number of polar groups exceed the number of fluoroaliphatic groups. However, in the case of acidic polar groups, particularly sulfonic acid groups, it is preferred that they be present in lesser number than the number of fluoroaliphatic groups.

Although it is indicated above that the polymer should contain an "F" segment of at least an average of two fluorinated aliphatic groups, it is contemplated that in certain polymer structures all the "F" occurrences may contain only one fluorinated aliphatic group but the polymer in such instance will contain nevertheless on the average at least 2 such groups by reason of having 2 or more "F" occurrences. Also in the case of a fluorinated aliphatic group which is branched, each fluorinated branch may be considered a fluorinated aliphatic group for purpose of the description.

A surface treated with a hybrid polymer of the above general structure is autoadaptable in character in that it exhibits hydrophobic and oleophobic properties in air, but due to the hydrophilic segments and to their flexibility and mobility within the hybrid polymer, the surface exhibits hydrophilicity and oleophobicity in water. Characteristically, polymers which exhibit the properties herein described and have the structure herein described have a shear modulus at the working temperature in an aqueous environment of less than $10^{10}$, preferably less than $10^7$, dynes/cm.$^2$.

The invention is further explained in its general terms by the drawings which are intended to emphasize and explain the invention and not to provide scale representations of the compositions or treated fabrics of the invention. In these drawings, we show diagrammatically structural conformations which are believed to prevail at surfaces coated with hybrid copolymers in accordance with this invention. The polarity of the environment controls these conformations to reduce the energy at the interface of the surface and its environment in accordance with thermodynamic principles. The ability to be controlled by the environment is governed, in turn, in the case of the segmented copolymers illustrated, by the provision of necessary segmental mobility in the component segments. The nature of the environment is not specified in the drawings and it will be recognized that variations from these diagrams are possible within the scope of the invention.

FIG. 1 shows diagrammatically an exposed surface treated with an oil and water repellent finish in accordance with this invention. The circles 10 designate diagrammatically the fluorochemical terminating groups which are seen when the surface is sufficiently enlarged. The terminating groups will tend to be in some degree organized and will cover most of the surface forming domains of oleophobicity. The ultimate end of each terminating group may be considered to be a trifluoromethyl group. Usually the last three carbon atoms of a terminating group should be fully fluorinated to assure suitable oleophobicity; the exposed surface area which is seen is an array of perfluoroalkyl groups.

Figure 2:
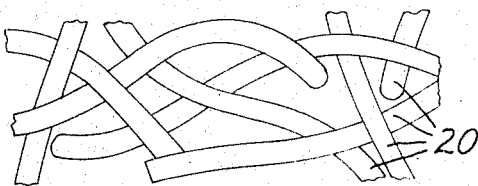

FIG. 2 shows in diagrammatic fashion an exposed hydrophilic surface in accordance with this invention. The exposed hydrophilic surface comprises hydrophilic substituent groups, e.g., —COOH, —OH. A fabric provided with such a surface is water-wettable and is cleanable by laundering. Heretofore it has been inconceivable that a given fabric could be treated so as to possess characteristics of both FIGS. 1 and 2 depending on the environment and that change of environment would effect reversal of the characteristics time after time.

Figure 3:
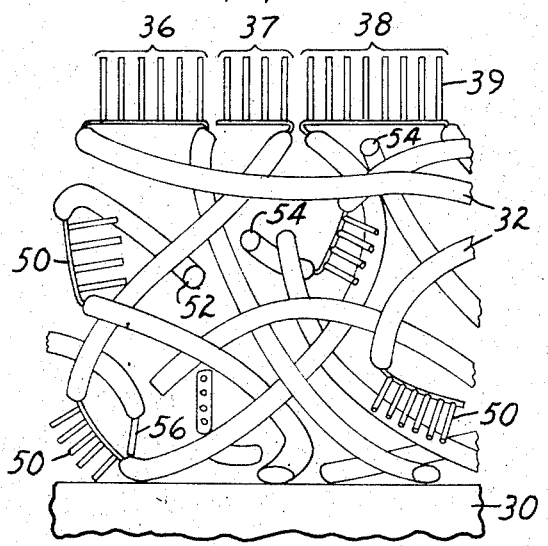

FIG. 3 shows, in highly diagrammatic fashion and in section, the outer layer of fiber 30 in a non-polar, e.g., non-aqueous, medium such as air. Deposited on this surface is an autoadaptable segmented polymer having hydrophilic "H" segments designated by the stands 32 and and hydrophobic and oleophobic "F" segments 36, 37 and 38, comprising a multiplicity of fluoroaliphatic or pendent groups, represented by slender rectangles 39, having fluoro-chemical terminating groups. Each pendent group and its associated portion of chain (intraconnecting structure) forms a structural unit of the segment. It will be noted that the "F" segments as shown in this figure contain from four to eight of these pendent groups. The number of these pendent groups in an occurrence may be from one or two upwards into the thousands. The average of such groups is two or more as explained above. "F" segments will be submerged in the bulk of polymer coating as shown at 50, as well as those on the surface, 36, 37, 38. "H" segments designated 32, which form the hydrophilic surface as shown in FIG. 2, are contracted in the non-aqueous medium of FIG. 3 so that their organization is minimal and no hydrophilic surface is evident. Intersected "H" segments are shown, for example, at 52, 54 and an intersected "F" segment at 56. The structural units in the hydrophilic segments are not represented separately in the drawings. Thus, the polymer as shown in FIG. 3 contains segments of two types. It is noted that there is no requirement that the structural units of an "F" segment be identical. Likewise, the structural units composing an "H" segment may not be identical with one another. Although the drawing shows the units of an "F" segment as essentially identical for convenience, it may be desirable that the structural units of either an "F" or "H" segment differ among themselves or that the units comprising different "F" or "H" segments be different or that other innocuous structures be included. In the non-aqueous milieu of FIG. 3 the hydrophobic "F" segments dominate the character of the exposed surface.

Figure 4:
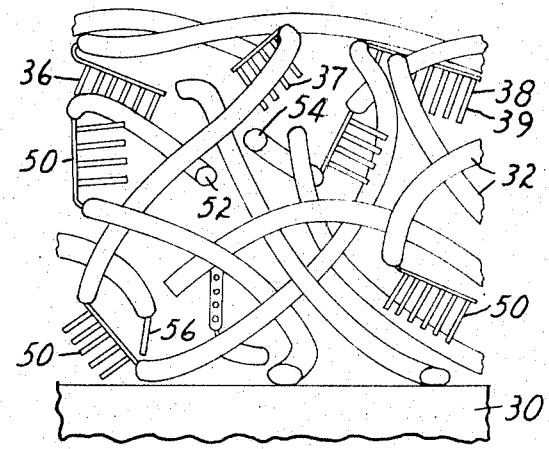

FIG. 4 which is in effect a cross-section through the plane of FIG. 2, shows the same surface portion 30 of a fiber but in an aqueous milieu which effects solvation (hydration) and extension of hydrophilic "H" segments 32. At the same time, displacement and movement of segments 36, 37 and 38 destroys the oriented character of the surface shown in FIG. 3 and changes the surface properties of the treated fiber by making the hydrophilic segments 32 dominant. The results are shown diagrammatically by submergence of hydrophobic and oleophobic "F" segments 36, 37 and 38 below the lines representing hydrophilic "H" segments 32 and by the displacement and disorientation of the submerged "F" segments. The hydrophilic groups of segments 32 present an exposed surface as shown diagrammatically in FIG. 2. Greater enlargement might permit recognition of specific hydrophilic groups and water of hydration.

In these figures no effort is made to show more than small portions of surfaces and it will be readily apparent that larger diagrammatic representations might become unwieldy. It will also be recognized that "F" segments 36, 37 and 38 in FIG. 3 are not necessarily segments of a single molecule but each may form a portion of separate molecules which happen to be aligned in this view. It should be noted that the "F" segments dominating the surface, e.g., in FIG. 3 are representative of many other "F" segments some of which, indicated by numeral 50, remain submerged while others dominate the surface. Domination of the surface whether by "F" or "H" segments is effected by emergency of a very small fraction of the specific type. The coating of polymer will thus present an exposed surface dominated by either "F" segments or "H" segments depending on the environment although shortly below the surface segments of both types will be present.

Hybrid polymers are broadly those copolymers comprising both oleophobic fluoroaliphatic groups and hydrophilic groups. It is preferred that they comprise pluralities of the said groups. They possess properties associated with the two types of groups to various extents depending on proportions, nature of connecting structures, configurations and other structural features and details.

The properties of hybrid polymers to be considered especially are oleophobicity, hydrophobicity, oleophilicity and hydrophilicity. Although these are often considered as properties of surfaces or interfaces and are thus related to measurements of contact angles, these properties are also associated with the bulk of the polymer as well as the substrate on which it may be supported. For additional clarity in describing the present polymers each of the four characteristics is combined with terms to indicate whether the property is considered for the surface of the polymer, e.g., external oleophobicity, etc., the bulk of the polymer, e.g., internal olephobicity, etc., or the substrate and its interface with the polymer, e.g., substrate oleophobicity etc.

In addition, external characteristics may be expressed with respect to various environments, e.g., in air, in water, in hydrocarbon, in organic solvent, etc. As in the case of certain copolymers described herein, external characteristics may be different, at least in degree, in different environments. Furthermore, as will be evident from the description herein, certain herein preferred polymers respond to changes in environment by altering their dominating external characteristics because of the internal characteristics of their compositions. Autoadaptability is thus seen to be a manifestation of mobility of segments in these preferred hybrid polymers possessing a balance of fluorinated aliphatic and hydrophilic groups.

Figure 5:
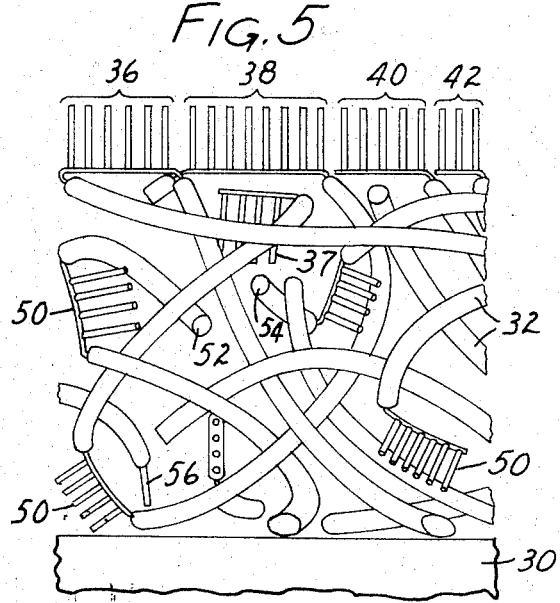

Reversibility of surface characteristics takes place by a change from the condition shown diagrammatically in FIG. 4 to that shown in FIG. 5. It is not necessary, nor necessarily probable, that identically the same orientation of segments should occur on reversal, i.e., upon drying of the laundered fabirc. The specific segments 36, 37 and 38 of FIG. 3 may even not appear on the surface after drying, but, nonetheless, the surface will be dominated by oleophobic "F" segments. This is shown diagrammatically in FIG. 5 where it will be apparent that segment 37 does not appear and that new segments 40 and 42 which are not apparent in FIG. 3 now form a portion of the organized surface.

The changes shown diagrammatically in FIGS. 3, 4 and 5 are possible only if sufficient rotatability or flexibility is present in the polymer chains. The mobility of the segments commences as the environmental temperature equals the glass temperature and increases as the latter temperature is further exceeded. Thus, polymers comparable in molecular weight to and of the same structure as "H" segments should have glass temperatures in water near or below the temperatures of laundering used in a cleaning cycle, e.g. 50–130° C. Some segmented polymers show no glass temperature associated with the "F" segments. For those that do, the glass temperature of the corresponding polymer should be below temperatures reached during drying in the cleaning cycle and is preferably below the laundering temperature. The glass transition temperature of "F" segments is not above 130° C. Segmented hybrid copolymers of the invention are thus non-glassy and amorphous at a temperature below the maximum of 130° C. attained during a laundering-drying cycle. Sufficient flexibility in polymers may be achieved by the use of components in the polymer molecule, such as in "H" 'segments, of the proper structural relationship. Such will provide elements other than carbon in the molecule, for example, oxygen or sulfur. Thus, hybrid polymers possessing hetero atoms in the chain form a preferred class of polymers. Interspersing or interposing hetero atoms is not, however, necessary to achieve flexibility because the length and linearity of the chain and presence or absence of side chains in the monomer may assure sufficient flexibility. Cross-linking is generally avoided because of its adverse effect on mobility.

In terms of the physical properties of the polymers of this invention, the shear modulus of the fully hydrated form of the polymer should be below about $10^{10}$ dynes/cm.$^2$ and preferably below about $10^7$ dynes/cm.$^2$ to permit change from oleophobic and hydrophobic to hydrophilic and oleophobic form. Because the polymer reverses its exposed aspect from hydrophilic and oleophobic to the oleophobic and hydrophobic form on drying, the nonhydrated polymer must also have a shear modulus below about $10^{10}$ dynes/cm.$^2$, or preferably below $10^7$ dynes/cm.$^2$, at a temperature reached during drying.

From the point of view of physically measurable properties, surfaces as shown in FIGS. 1 and 2 formed by polymers of this invention can be characterized by surface tension and/or interfacial tension measurements or by contact angle measurements. Thus, a fluorocarbon surface as represented by FIG. 1 is both hydrophobic and oleophobic. Water and n-hexadecane have contact angles to the surface of FIG. 1 greater than 70° and 50° respectively indicating that both wet this surface with difficulty.

During laundering, water wets the hydrophilic surface represented in FIG. 2 and therefore has a contact angle thereto well below 40°. Hexadecane, when in water, shows a contact angle above about 90° to this hydrophilic surface of FIG. 2 which insures the displacement and release of interstitial oily materials by the water. This contact angle of hexadecane of 90° or more indicates that in water, as by immersion of a treated fabric, the treated surface is oleophobic in contrast to heretofore known hydrophobic treatments which are oleophilic in water during laundering.

This contrast with prior treatments spells the difference between heretofore permanent oily staining and our new launderability with release of stains.

In addition to the useful data obtained by measuring external characteristics of polymers, it is also useful to measure internal characteristics, i.e. internal oleophilicity and internal hydrophilicity. Not only is this useful but the procedure is considerably easier to carry out. These are determined in terms of weight increase (e.g. in percent) by absorption of certain organic substances. Cyclohexane is founnd to provide a good indication of internal oleophilicity and methanol of internal hydrophilicity. It is found that, for a hybrid copolymer to provide a launderable finish, absorption of methanol should be at least 10 percent by weight at 25° C. and of cyclohexane less than twice the absorption of methanol at the same temperature. These figures provide measures of internal hydrophilicity and internal oleophilicity of the polymer respectively and the proportions indicate the balance which characterizes a copolymer providing a launderable finish.

We have discovered new and novel relatively high molecular weight materials having the above-described properties. These materials include block or graft copolymers, or block and graft copolymers, which have at least two different segments one of which, elsewhere referred to as an "F" segment, is highly fluorinated and oleophobic and the other of which, referred to as an "H" segment, is water-solvatable or hydratable. The invention thus includes such polymers, processes for making them, processes for using them and articles, such as fabrics, treated with them.

The polymers generally contain "H" and "F" segments in proportions respectively of about 10 to about 90 percent by weight up to about 90 to about 10 percent by weight although the proportions are preferably in weight ratios of about 1:4 to about 4:1. They contain at least 1 percent by weight of bound fluorine. In any event the proportion of "F" segments is sufficient to assure insolubility in water at temperatures of laundering e.g., below 130° C. In block copolymers the segments alternate, e.g., FH, FHF, HFH, FHFHFHF or HFHFHFH etc., from as few as two segments up to possibly a total of 1000 or more segments. Each "H" or "F" segment may be made up of a multiplicity of two or more structural units, containing polar groups and $R_f$ groups respectively, which may be linked together either during formation of the polymer or may be linked together in a prepolymer which is then used in preparing the polymer of the invention. Those skilled in the art will select methods of production, proportions and conditions of reactions based on our present disclosure in accordance wtih the desired ultimate structure.

Treated fabrics of the invention are obtained by application to fabrics of hybrid polymers from the entire broad class disclosed and described herein. It is found that these polymers are generally amenable to any of the methods heretofore used for padding or treatment of fabrics. Application may, for example, be from solution or emulsion in suitable solvents or liquids sprayed or padded on the fabric. After drying, novel combinations of fabric and polymer coating are obtained. In one embodiment of the invention these treated fabrics are oleophobic and hydrophobic and hence stain resistant in a non-polar environment, e.g., in the presence of air, and become hydrophilic and release soil and oily stains by simple laundering in the presence of water. On drying after laundering the fabrics become oleophobic and hydrophobic and oil and stain resistant again. This cycle is repeatable with the ready reversibility of the properties of the treated fabric.

In another embodiment of the invention the treated fabrics have at least sufficient net oleophobicity to resist wicking or diffusing of oily stains and are hydrophilic and release oil stains on laundering. There may be a net oleophobicity after drying even if oil repellency as measured by usual tests may be essentially minimal after laundering and drying.

The fibers of the fabric in the various embodiments may be entirely natural such as cotton, silk, wool, etc., or entirely synthetic such as the nylons, polyesters, such as polyethylene terephthalate, etc. and the fabric may consist of only one type or the two types may be present together as separate filaments or in blends such as 50:50 or 35:65 of cotton and polyethylene terephthalate. The weave may be of any desired type or count and the fabric may be of a non-woven type.

Our invention is described herein particularly with reference to polymeric materials characterized by physical properties, chemical structures and behavior to water and hexadecane. It will be understood without repeated recitation that the invention includes fabrics treated with such polymeric materials and the processes resulting in such treated fabrics including the initial treatment of the fabric and also the laundering and drying processes which result in regenerating the cleaned treated fabric with soil and stain repellent properties.

One mode we presently contemplate for practicing our invention as embodied in novel compositions is by the formation of segmented polymers comprising oleophobic and hydrophobic perfluoroalkyl group-containing "F" segments and hydrophilic and, in water, oleophobic polar group-containing "H" segments, the latter having chains interrupted by hetero atoms, particularly oxygen or nitrogen but including optionally sulfur in place of one or more oxygens in a given chain. The hetero atom carrying chains may be dependent or catenary; that is, they may be grafted onto the main polymer backbone or they may be included in the main backbone as blocks. It will be recognized that each of the "H" and "F" segments is composed of a multiplicity of structural units. As noted hereinabove the structural units composing a given segment need not be identical nor do segments of the one type need to be identical in size or structural units. Linking groups in the polymer structure may conveniently be regarded as parts of one segment or the other.

An important characteristic of the hydrophilic "H" segments of the invention is that they are solvatable. One readily available and convenient group for conferring this feature is the ether oxygen atom, i.e., oxa group present in oxyethylene or oxypropylene. Materials having such oxa groups are readily available commercially in polyoxyethylene and polyoxypropylene glycols and their derivatives and provide very effective hydrophilic "H" segments as more fully described herein. Desiraby each "H" segment will include at least three ether oxygen atoms and up to several hundreds or even thousands. Polyoxyethylene groups are preferred. Nitrogen is another element which may be present as hetero atoms, e.g., as secondary or tertiary amine or amide groups in numbers comparable to the numbers of oxygens in other "H" segments. For example, polyethyleneimine blocks introduce aza groups into the "H" segments and can be further modified, if desired, to alter their properties.

Insofar as our invention is embodied in treated fabrics and processes for treating fabrics to produce the highly desirable combination of properties we have disclosed, we contemplate that the hydrophilic segments of the polymers used may be of substantially any type with or without hetero atoms in the chain. Such segments will bear pluralities of structural units containing characteristic solvatable polar groups such as ether oxygen atoms (as described above); hydroxyl; carboxyl; primary, secondary, tertiary or quaternary amino; sulfonic, phosphonic and other such substituent groups either as acids or in the anionic form. Typical examples of structural units containing such polar groups include:

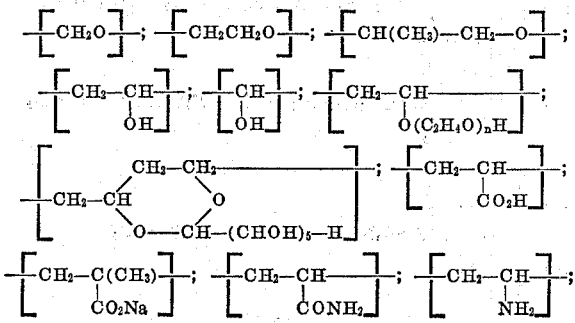

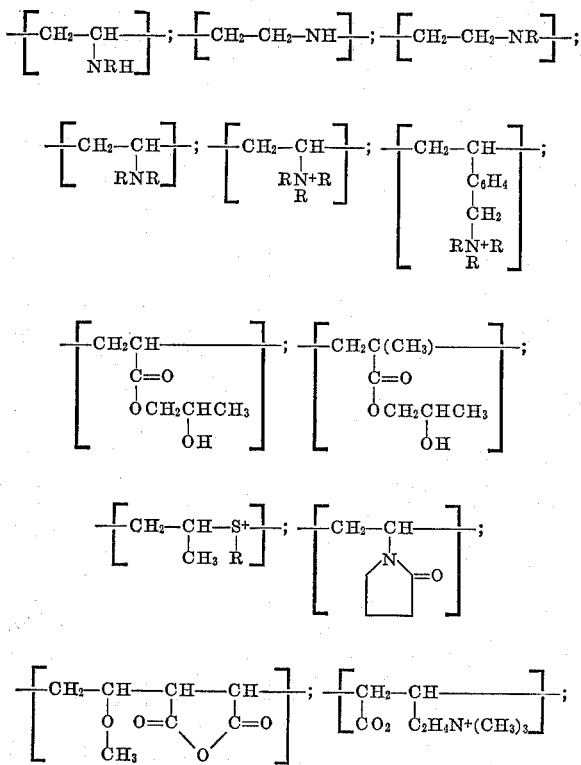

where R represents hydrogen or an alkyl radical of preferably not more than six carbon atoms and $n$ is an integer.

Whatever such groups are selected must be present in sufficient proportions to render the segment solvatable to the extent of being hydrophilic and to effect dominance over the fluorochemical segments in aqueous milieu.

It will be apparent that the above structural units are the nuclei of simple compounds. The compounds themselves are formally obtainable by satisfaction of the valencies of the structural units by hydrogen atoms. These simple compounds are preferably water soluble at least to the extent of 15 percent by weight at 25° C.

Structural units which are related to simple water soluble compounds as above are generally useful in the formation of "H" segments. In order to provide some quantitative measure of the proportion of structural units containing polar groups needed to provide a useful degree of hydrophilicity in the polymers of the invention it is generally found that the structural units, including associated cations or anions, must provide about 25 percent by weight or more of the hydrophilic "H" segments. Less hydrophilic structural units such as $-CH(CH_3)CH_2O-$ may be need in higher proportions than more hydrophilic groups such as sulfonic acid groups. If the substituent functional groups constitute less than about 20 percent by weight, the "H" segments will generally be inadequately hydrophilic although in some cases useful "H" segments may contain as little as 10 percent of the polar groups.

"H" segments may be formed from one or more ethylenically unsaturated materials such as methacrylamide, sodium acrylate or methacrylate or other salts or the acids, vinyl pyrrolidone, itaconic or citraconic acid or salts, vinyl ethers, maleic anhydride, dialkylaminoalkyl acrylates and methacrylates, vinyl acetate, styrene, butadiene, acrylonitrile, vinyl chloride. Preferably, the latter five materials are modified in the prepolymer or in the final polymer to provide enhanced hypdrophilicity, e.g., by hydrolysis, sulfonation, oxyalkylation, grafting. "H" segments may also be formed so as to comprise numerous oxyalkylene groups, particularly $C_2H_4O$ and $C_3H_6O$ groups, which may also form portions of ethylenically unsaturated materials.

One particular type of "H" segment is provided by prepolymers prepared from the copolymerization of terminally ethylenic monomers and disulfhydryl compounds (including H₂S) as described by Erickson in U.S. Pat. 3,278,352. Thus, hydrogen sulfide and polyethylene glycol dimethacrylates give sulfhydryl terminated prepolymers:

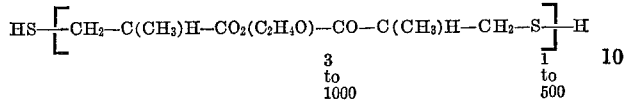

A block copolymer is formed when an ethylenically unsaturated fluorinated monomer is polymerized free radically in the presence of the sulfhydryl terminated prepolymer. The segmentation of the polymer arises as a result of free radical chain transfer of the growing fluorinated polymeric unit to the sulfhydryl end groups.

From our disclosure and examples, those skilled in the art will readily perceive other methods for providing hydrophilic segments of polymers, herein termed "H" segments, and condensing, coupling or otherwise combining them in polymeric molecules with oleophobic segments.

The hydrophobic and oleophobic "F" segments are composed of recurring units having pendent chains of perfluorinated carbon atoms as noted above which may be more particularly described as fluorinated aliphatic radicals.

The fluorinated aliphatic radical $R_f$ is a fluorinated, saturated, monovalent, non-aromatic, aliphatic radical of at least 3 carbon atoms. The chain may be straight, branched or, if sufficiently large, cyclic, and may be interrupted by divalent oxygen atoms or trivalent nitrogen atoms bonded only to carbon atoms. Preferably the chain of the fluorinated aliphatic radical does not contain more than one hetero atom, i.e. nitrogen or oxygen, for every two carbon atoms in the skeletal chain. A fully fluorinated group is preferred, but hydrogen or chlorine atoms may be present as substituents in the fluorinated aliphatic radical provided that not more than one atom of either is present in the radical for every two carbon atoms, and that the radical must at least contain a terminal perfluoromethyl group. "Terminal" in this connection refers to the position in the skeletal chain of the radical which is furthest removed from the backbone chain of the segment. Preferably the fluorinated aliphatic radical contains not more than 20 carbon atoms because such a large radical results in inefficient use of the fluorine content.

Fluorinated aliphatic radicals are held together in the "F" segments in groups on the average of at least two by attachment to a skeletal chain, directly or through linkages made up of various combinations of functional groups and/or hydrocarbon chains. These linkages are basically irrelevant to the practice of the invention insofar as they have no recognizable effect on either oleophobicity or hydrophilicity. In a somewhat diagrammatic manner an "F" segment may be represented:

($R_f$—linking group)$_x$—(segmental skeletal chain)

As indicated hereinabove the value of $x$ is at least two and $R_f$ is a suitable fluorinated aliphatic radical. It is, of course, possible that other pendent groups which do not mask the $R_f$— groups may be comprised in the segmental skeletal chain.

The method of forming the segment is determined by the structure desired in the polymer being produced. Thus, condensation and addition reactions including olefinic polymerizations whether by anionic, cationic or free-radical mechanisms are suitable for the formation of segmental skeletal chains with appropriate pendent $R_f$— groups. Moreover, the $R_f$— groups may be attached by conventional reactions to suitable previously prepared, or naturally occurring, poly-functional compounds having sufficient functionality to provide the skeletal chains of segments either per se or by subsequent reaction.

Illustrative of compounds suitable for condensation and addition reactions of some types, e.g., to provide "F" segments, include:

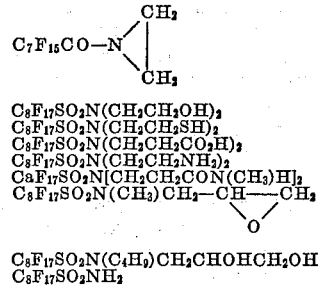

C₈F₁₇SO₂N(CH₂CH₂OH)₂
C₈F₁₇SO₂N(CH₂CH₂SH)₂
C₈F₁₇SO₂N(CH₂CH₂CO₂H)₂
C₈F₁₇SO₂N(CH₂CH₂NH₂)₂
C₈F₁₇SO₂N[CH₂CH₂CON(CH₃)H]₂
C₈F₁₇SO₂N(CH₃)CH₂—CH——CH₂
                         \ /
                          O

C₈F₁₇SO₂N(C₄H₉)CH₂CHOHCH₂OH
C₈F₁₇SO₂NH₂

Members of each series wherein the fluorinated group is from $C_3F_7$ to about $C_{20}F_{41}$ are also suitable without the extended enumeration of each.

The above materials may be modified, for example, by converting the diol to the diisocyanate or to the diacrylate, as shown below, to provide other "F" segment forming molecules:

C₈F₁₇SO₂N(C₂H₄O₂CCH=CH₂)₂

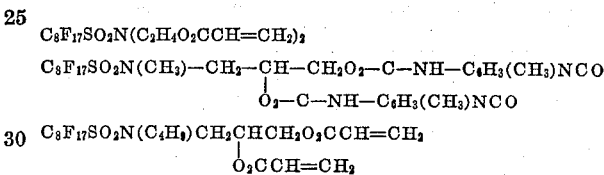

C₈F₁₇SO₂N(C₄H₉)CH₂CHCH₂O₂CCH=CH₂
                        |
                        O₂CCH=CH₂

Ethylenically unsaturated materials suitable for providing fluoroaliphatic radical-containing structural units, such as in "F" segments, by polymerization mechanisms including free radical, cationic, and anionic processes include:

C₈F₁₇SO₂N(CH₃)CH₂(C₆H₁₀)CH₂O₂CCH=CH₂
C₈F₁₇SO₂N(CH₃)CH₂(C₆H₄)CH=CH₂
C₃F₇CH₂O₂CCl=CH₂
C₆F₁₃C₂H₄O₂CC(CH₂OH)=CH₂
C₈F₁₇CONHCH=CH₂
C₈F₁₇SO₂N(C₂H₅)C₂H₄COOCH=CH₂
C₇F₁₅C₃H₆COOCH=CH₂
C₄F₉COOCH₂CH=CH₂
C₈F₁₇SO₂N(C₂H₅)COCH=CH₂

C₈F₁₇SO₂N(CH₃)C₁₁H₂₂O₂CNH(C₆H₃—
                    CH₃)NHCO₂C₂H₄O₂CC(CH₃)=CH₂

C₇F₁₅CH₂O₂CCH=CHCO₂CH₂C₇F₁₅
C₃F₇CH₂O₂CCF=CH₂
C₃F₇CH₂O₂CCF=CF₂
(C₃F₇)₃CCH₂O₂CCH=CH₂
C₈F₁₇(CH₂)₃O₂CCH=CH₂
C₈F₁₇COOCH₂CH₂CH₂O₂CCH=CH₂
C₈F₁₇(CH₂)₁₁O₂CC(CH₃)=CH₂
C₈F₁₇SO₂CH₂CH₂O₂CCH=CH₂
C₈F₁₇SOCH₂CH₂O₂CCH=CH₂
C₈F₁₇CON(C₂H₅)(CH₂)₂O₂CC(CH₃)=CH₂
C₁₂F₂₅SO₂NH(CH₂)₁₁O₂CC(CH₃)=CH₂
C₁₂F₂₅SO₂C₆H₄CH=CH₂
C₈F₁₇SO₂N(CH₃)CH₂CH₂CH₂OCH=CH₂
CF₃C(CF₃H)F(CF₂)₁₀CH₂O₂CCH=CH₂
CF₃C(CF₂Cl)F(CF₂)₁₀(CH₂)₂O₂CCH=CH₂
C₈F₁₇SO₂N(CH₃)CH₂O₂CC(CH₃)=CH₂
C₂F₅(OCF₂CF₂)₃OCF₂CF₂CON(CH₃)CH₂CH₂O₂CCH=CH₂
(C₄F₉CO)₂NCH₂CH₂O₂CC(CH₃)=CH₂
C₈F₁₇SO₂N(CH₃)CH₂—CO—CH=CH₂

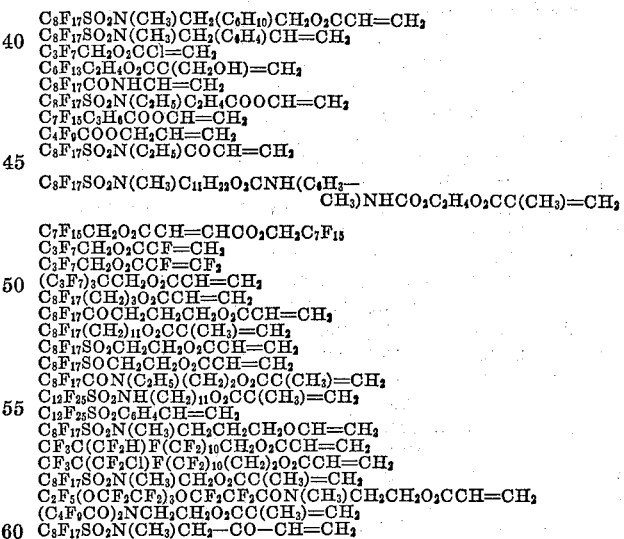

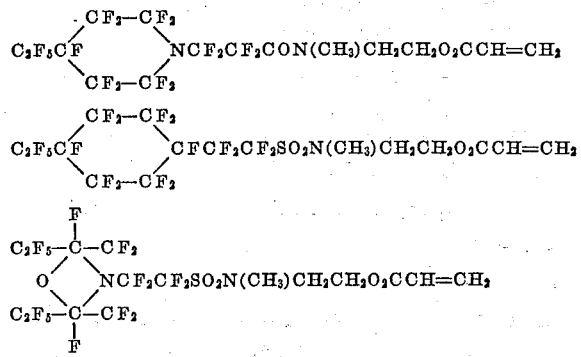

It will be evident that the segment-forming components comprise a perfluorinated terminating group and a reactive group connected by a linking group. For purposes of reference the linking group may for convenience be termed a Q group. It will be clear from the above tabulations of segment-forming components that the Q group may have almost infinitely varied structures and in a material such as $R_fNCO$ vanishes entirely. In some instances it will be seen that more than one $R_f$ group may attach to a single Q group and in other instances a single $R_f$ group may attach to more than one reactive group. Preefrably the "F" segment comprises at least 10 percent by weight of fluorine derived from fluoroaliphatic radicals. It is still more preferred that "F" segments comprise at least about 30 percent by weight of fluorine derived from fluoroaliphatic radicals in order to reduce tendencies to internal oleophilicity as well as to increase external oleophobicity. It will be recognized that there is a maximum of about 75 percent by weight of fluorine in a fully fluorinated fluoroaliphatic radical.

Generally the structure of the Q group is immaterial. However, for example, a Q group comprising a paraffinic radical (divalent or polyvalent) of more than about 18 carbon atoms may require an impractically large $R_f$ group in order to overcome oleophilic tendencies which may be associated with such a large paraffinic radical.

One of the general methods for producing suitable segmented copolymers is by combination of partially preformed "F" and "H" segments containing reactive groups, such as amine, hydroxyl, halide, acid, acyl halide, isocyanate and the like. "F" and "H" segments with mutually coreactive groups such as acyl halide on the one type of segment and hydroxyl or amine on the other, are conveniently combined directly. Those with like groups are conveniently combined using a difunctional linking compound e.g., acyl halide-containing segments linked by a glycol, a diamine or an amino alcohol.

Methods for introducing functional groups into prepolymer intermediates are well known, and described in standard texts such as Fettes, "Chemical Reactions of Polymers," Interscience Publishers, New York, 1964, particularly in chapters 4 and 10.

In general monofunctional prepolymers are useful in providing terminal or pendent segments. Difunctional prepolymers can be used for chain extension, as bases for graft or termination reactions, and the like. Inasmuch as substantially linear segmented polymers are preferred over cross-linked polymers, because of the greater segmental mobility of the former, segments with higher functionality are used generally in conjunction with monofunctional reactants.

An especially valuable series of copolymers of the invention is obtained using polyoxyalkylene glycols in the hydrophilic "H" segments. Thus, the acrylates or methacrylates of polyoxyethylene glycols are condensed or telomerized in the presence of base such as diisopropylamine or triethylamine with disulfhydryl compounds (including $H_2S$) as described by Erickson in Journal of Polymer Science, pt. A-1, vol. 4, pp. 519 et seq. (1966). In most of these compounds the polyoxyethylene glycol has a molecular weight in the range of about 150 to 10,000 or more and it is repeated from one to 500 or more times. Polyoxypropylene diol alone or in combinations is also useful.

Our invention is further illustrated by examples showing the best mode presently contemplated of practicing it and how it is used. In these examples parts and percentages are by weight and temperatures are in degrees centigrade where not otherwise indicated. Before presenting the actual examples, a summary is provided of procedures which are useful in evaluating fabrics and compositions for the properties which are of special interest in connection with our invention.

The terms "staining" and "stain" pertain to localized soiling whereas the term "soiling," used alone, implies a more uniformly distributed soil-producing material. One method for the evaluation of stain removal is based on applying a standard stain to a treated or untreated fabric swatch, subjecting the stained swatch to a standard laundering procedure, and determining the reflectance of the cleaned swatch in the originally stained area in comparison with a portion of the same treated or untreated swatch which was not stained.

A beige or a tan colored fabric has been found most sensitive, since the high reflectance of white colored fabrics and the low reflectance of dark colored fabrics tend to minimize differences between stained and unstained portions, although the eye can sometimes detect small differences more readily on these latter fabrics.

The test swatch of treated fabric about 10 by 20 cm. is placed on a flat surface supported by 8 plies of cheese cloth. At room temperature (25° C.) 10 drops of corn oil are placed in the center of the swatch, the pool of oil covered by a 10 by 10 cm. sheet of glassine paper and a brass weight providing a pressure of about 70 grams per square cm. over an area of about 30–35 cm.$^2$ is placed on the paper for a period of 4 minutes. These conditions produce a severely stained fabric.

The samples are laundered in a home-style top-loading washing machine, agitator type, with 2 pounds of cotton fabric as ballast, the water temperature is maintained at about 60° C., the water level is set for ½ load, and 100 ml. of a commercial powdered anionic detergent ("Tide") is used. In some industrial or institutional uses, e.g., sterilization, higher water temperatures are used in laundering, e.g. 130° C. and above.

The samples are evaluated for stain resistance initially (before laundering) and after 5 consecutive launderings (i.e., without intervening drying cycles) followed by tumble drying at a maximum temperature of about 60–70° C. For the evaluation of stain removal, samples may be removed after the first laundering, tumble dried, and tested or may be subjected to several additional laundering cycles, without intervening drying, then dried, restained, laundered once more followed by tumble drying and again rated.

Evaluation of stain removal by reflectance.—The efficiency of stain removal is evaluated by a cleanability coefficient, $\Delta K/S$ [C. P. Kubelka and F. Munk, Z. Tech. Physik, 12, 593 (1931)]. Values of $\Delta K/S$ below about $0.10 \pm 0.03$ indicate acceptable stain removal from the test fabric, and values below 0.03 indicate no visually appreciable stain retention. High values indicate greater stain retention and values above about 0.20 indicate so much stain retention as to be unacceptable for many purposes. The extent of stain retention ($\Delta K/S$) is calculated from the reflectance values of originally stained and unstained portions of the same piece of material as measured by a reflectometer. The $K/S$ values are calculated using the Kubelka-Munk equation:

$$K/S = (1-R)^2/2R,$$

where R is the observed reflectance, K is the coefficient of reflectivity and S is the coefficient of light scattering. $K/S$ is almost a linear function of the amount of soil present on the fabric. $\Delta K/S$ is the difference between the $K/S$ of the originally stained portion of the fabric and the unstained portion of the same swatch of fabric.

Evaluation of stain removal by visual observation.—The visual ratings for cleanability shown in the following examples are run as described herein. An apparatus is set up as described in the 1964 Technical Manual of the AATCC, vol. 40, p. B-95, Howes Publishing Co., 44 E. 23rd St., New York, with the overhead lighting arrangement shown in FIG. 2.

Fabrics are stained and washed as described above. The samples to be tested are placed on black table top directly in front of viewing board. The samples are rated for cleanability according to the following rating scale, in accordance with the nomenclature suggested on p. B-52 of the above reference.

Rating:         Significance
- 5 ----- Negligible or no staining (excellent cleanability).
- 4 ----- Slightly stained (good cleanability).
- 3 ----- Noticeably stained (fair cleanability).
- 2 ----- Considerability stained (poor cleanability).
- 1 ----- Heavily stained (very good cleanability).

Evaluation of stain resistance.—In one embodiment of this invention fabrics are produced which are highly resistant to staining by both water-borne and oil-borne sources. The test method used in evaluating such fabrics for oil repellency is described in Textile Research Journal 32, 321–331 (1962). The test for water repellency, or spray rating, is AATC Standard Test No. 22–52, first appearing in the Year Book of the American Association of Textile Chemists and Colorists, 28, 126 (1952). In both of these tests, the higher the rating number, the more stain resistant is the treatment.

Contact angle measurement.—One basis for predicting the efficiency of a polymeric fabric treatment in resisting stains and permitting stain removal is by measurement of the contact angle of aqueous and non-aqueous, e.g., hydrocarbon, media on a surface coated with the polymer. In order to obtain a smooth reproducible surface, such tests are best performed on a polymer film deposited from solution in an appropriate solvent, e.g. $CHCl_3$, methyl isobutyl ketone or the like, on a smooth substrate rather than the polymer-treated fabric with variable surface roughness and an extensive capillary structure. A piece of poly(ethylene terephthalate) approximately .05 mm. thick of convenient size is prerinsed in the solvent and air dried in a dust-free nitrogen atmosphere. A separate piece is required for each measurement. In the dust-free atmosphere, the dried film is then dipped in a 4 weight percent solution of the polymer, allowed to drain and then air dried at room temperature, then heated in an oven for 10 minutes at 95° C. After cooling, the coated sample is attached to the surface of a glass microscope slide by convenient means, e.g. doubly-coated transparent tape. Throughout the treating and sample preparation, great care is taken to avoid contaminating the surface to be treated with finger prints, dust and the like. In cases where the sample is to be subjected to hot water treatment as described below, it is first immersed in the hot water and subsequently attached to the slide.

Contact angles are measured directly using suitable optical systems on samples maintained in a covered container in an atmosphere saturated with vapor at a temperature constant at 23°±1° C. Drops are applied by a syringe inserted through the cover to a slide supported in the container.

For measurement of hexadecane contact angles in air, samples and equipment are allowed to equilibrate at 23° C. for 15 minutes. Three or four separate drops are then placed on the sample surface and the contact angle measured repeatedly for each drop until consistent readings are obtained. The maximum angle observed corresponds to the contact angle, since irregularities in the surface will always cause a low apparent angle. For measurement of contact angles of water in air, the values may decrease with time as the surface becomes hydrated. The reading must, therefore, be taken within no more than 5 seconds, preferably within 2 seconds, after drop placement, if a decreasing value with time is observed. This can be achieved by approximating the angles on a series of water droplets, and then rapidly observing the angles of fresh droplets.

For measurements in water, the slide is inserted with sample side down in a cell filled with deionized water at 23° C. and droplets of n-hexadecane are placed on the bottom surface by means of a hooked needle on the syringe. Observations are continued for at least 30 minutes to insure equilibrium conditions.

For measurements in air after immersion in water at 23° C., the coated film sample is first immersed for at least 30 minutes. Coated film samples of polymers which have internal hydrophilicity up to about 10 percent (measured using water absorption) are merely shaken to remove liquid water and the sample is mounted and placed in a cell at 23° C. a few minutes thereafter.

Samples of polymers which have internal hydrophilicity greater than about 10 percent are dried at 25° C. and 1 mm. Hg pressure for 16 hours and then conditioned by exposure to 50 percent relative humidity for 24 hours before being tested.

For testing in water at 80° C., the initial immersion is in water preheated to and maintained at 80° C. For measurements in air at 23° C. after exposure to water at 80° C., a 30 minute immersion of the coated film sample at 80° C. is followed by cooling in water to 23° C., removal of excess water and then mounting the coated film on a glass slide. For measurement at 23° C. after drying at 80° C., the coated film is freed from excess water, mounted on a glass slide and then heated in air at 80° C. for 10 minutes and then placed in the cell.

Determination of internal oleophilicity, etc.—Solid copolymers are obtained from solution or suspension by preliminary drying at 25° C. under vacuum. Portions weighing 0.2 to 0.5 gram are placed in a tared uncovered ointment tin, heated for 10 minutes at 170° C. at atmospheric pressure, and weighed. The samples in their containers are then placed in desiccators containing a supply of water, cyclohexane or methanol which are used as the test solvents. The desiccator is then evacuated until ebullition of solvent flushes most of the air from the system, the desiccator outlet closed and equilibration allowed to continue for 72 hours at 25° C. The desiccator is then repressured and the sample removed and weighed.

Shear modulus and loss modulus.—Shear and loss moduli characterize the ability of the segments of the polymer to move with relation to each other and correlate with the rigidity of the polymer.

These terms and the associated physical properties and methods of measurement are described in standard references such as L. E. Nielsen, "Mechanical Properties of Polymers," pp. 2–4, Reinhold Publishing, London, 1962; J. D. Ferry, "Viscoelastic Properties of Polymers," pp. 11–13, John Wiley and Sons, New York, 1961; and particularly in the tentative method of test ASTM D2236–64T. The terms are defined as:

Shear modulus is the ratio of shear stress to the shear strain.

Loss (damping) modulus is the out-of-phase component of shear stress, and is the fraction of the applied energy dissipated as heat.

Loss factor (tan $\delta$) is the ratio of the loss modulus to the shear modulus.

The test samples used in the following examples are prepared by saturating a porous polyamide/polypropylene non-woven strip weighing about 0.4 g. and having the dimensions 2.5 x 1.0 x 0.35 cm. with sufficient polymers solution to deposit approximately 0.3 g. of dry polymer within the porous web. The samples are dried at 40° C. in vacuum. Each composite specimen is subjected to periodic torsional stress at 0.5 cycle/sec. over a temperature range upwards from about −70° C. Glass transition temperatures are identified as peaks of the tan $\delta$ versus temperature curve.

EXAMPLE 1

This example illustrates the preparation of an FHF block copolymer and its use to provide treated fabric which has good resistance to oily or water-borne stains, which readily releases oily stains during laundering, and which regains its stain resistance on drying.

To a 40 ml. glass vial is charged:

| | Grams |
|---|---|
| Methyl isobutyl ketone solvent | 15.0 |
| Tert-butyl hydroperoxide initiator | 0.0075 |
| $C_8F_{17}SO_2N(C_2H_5)C_2H_4O_2CC(CH_3)$—$CH_2$ | 2.5 |
| Tetraethylene glycol dimethacrylate-$H_2S$ prepolymer | 2.5 |

The prepolymer was prepared in accordance with the method of Erickson, U.S. Pat. 3,278,352, Example 1, and has the average approximate composition:

$$HS[CH_2C(CH_3)HCO_2(CH_2CH_2O)_4COC(CH_3)HCH_2S]_{11}H$$

This liquid prepolymer at 25° C. in $CHCl_3$ has an inherent viscosity of 0.12 and a surface tension at 25° C. of 43.7 dynes/cm. This liquid prepolymer is substantially insoluble in water but dissolves 3.8 wt. percent water after exposure for 24 hours at 25° C. to air saturated with water vapor.

The vial is flushed with oxygen-free nitrogen, sealed, and rotated for 17 hours in a water bath maintained at about 75° C. to allow polymerization to take place. A 95 weight percent yield of a block copolymer was obtained with an average composition of:

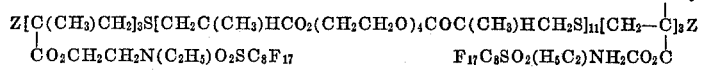

where Z represents an adventitious terminal group, usually a hydrogen atom but which may be a fragment of the initiator, another "H" segment, and the like.

A film cast from the above polymer solution is clear, soft, and putty-like. Such a film, from the above polymer prepared in $CH_3CCl_3$ as solvent and cast on a poly (ethyleneterephthalate) sheet substrate is used for measurement as previously described of contact angles with the following results.

| Test: | Contact angle, degrees |
|---|---|
| In air, 23° C.— | |
| n-Hexadecane | 70 |
| Water | 97 |
| In water, 23° C.— | |
| n-Hexadecane | 106 |
| In air, 23° C., after drying— | |
| n-Hexadecane | 72 |
| Water | 81 |

The block copolymer was found to have a glass temperature of about —49° C. It absorbs 1.8 percent of water, 11.9 percent of methanol and 2.1 percent of cyclohexane, all by weight.

Two fabrics, one a tan 50/50 polyester/cotton twill and the other a tan 65/35 polyester/cotton poplin, are pretreated with a deferred-cure permanent press resin by padding with an aqueous solution containing 11 percent dimethylol dihydroxyethyleneurea resin and 1.5 percent zinc nitrate catalyst (Resin-Catalyst Solution) to provide an 8 percent increase in weight of the fabric after air drying.

A 1 percent solids treating solution is prepared by dilution of the above polymerization solution with methyl isobutyl ketone, and the resin pretreated fabrics are padded with this solution at 40 pounds nip pressure to give a 75 weight percent wet pickup. The fabrics are then dried and cured in a circulating air oven for 15 minutes at 166° C.

The treated fabrics are tested for stain repellency, durability, and release of stains with the following results:

| Fabric | 50/50 | 65/35 |
|---|---|---|
| Initial ratings: | | |
| Oil | 100 | 100 |
| Spray | 70 | 70 |
| After 5 launderings: | | |
| Oil | 80 | 80 |
| Spray | 50 | 70 |
| $\Delta K/S$ | 0.04 | 0.09 |

After five launderings, the sample is tumble dried, the test swatches again stained with corn oil, relaundered, and dried. $\Delta K/S$ values of 0.02 for the 50/50 fabric and 0.04 for the 65/35 are obtained, showing no significant deterioration in the effectiveness of the treatment with respect to ease of stain removal.

EXAMPLE 2

This example illustrates the application of the block copolymer of Example 1 from aqueous dispersion either after the fabric has been pretreated with a crease-proofing resin or in conjunction with such resin.

Swatches of 50/50 twill and 65/35 poplin polyester/cotton fabrics are treated by the following three methods with the block copolymer of Example 1 from a solution containing 1 percent copolymer solids.

(A) This treatment is the same as in Example 1 in which a solution of 1 percent polymer solids in methyl isobutyl ketone is padded on resin pretreated fabrics.

(B) A dispersion is prepared by admixing:

| | Grams |
|---|---|
| Block copolymer product solution of Example 1 in methyl isobutyl ketone | 4.2 |
| Polyoxyethylene sorbitan monooleate | 0.03 |
| $[C_8F_{17}SO_2NHC_3H_6N(CH_3)_3]^+Cl^-$ | 0.02 |
| Water | 95.8 | and by passage of the admixture three times through a hand homogenizer pump. The thus prepared dispersion is padded onto resin-pretreated fabric.

(C) A second dispersion containing 2 percent polymer solids prepared as in (B), by the use of only 45.8 g. of water is used. This dispersion is then diluted with the aforesaid Resin-Catalyst Solution to form 100 g. of an aqueous pad bath containing:

| | Grams |
|---|---|
| Block copolymer solids | 1.0 |
| Methyl isobutyl ketone | 3.2 |
| Crease proofing resin | 11.0 |
| Zinc nitrate | 1.5 |

This dispersion is padded onto the untreated fabrics.

In all three cases, the treated fabric is cured for 15 minutes at 166° C.

The test swatches of the treated fabrics are rated as above with the following results:

| Fabric | A | | B | | C | |
|---|---|---|---|---|---|---|
| | 50/50 | 65/35 | 50/50 | 65/35 | 50/50 | 65/35 |
| Initial ratings: | | | | | | |
| Oil | 100 | 100 | 100 | 100 | 100 | 100 |
| Spray | 70 | 70 | 70 | 70 | 70 | 70 |
| After 5 launderings: | | | | | | |
| Oil | 80 | 80 | 70 | 80 | 80 | 90 |
| Spray | 50 | 70 | 50 | 70 | 50 | 70 |
| $\Delta K/S$ | 0.04 | 0.09 | 0.02 | 0.00 | 0.04 | 0.06 |

Essentially the same performance is obtained by each method of applying the block copolymer.

EXAMPLE 3

This example shows a comparison of the properties of fabric treated with two different block copolymers of the same unit composition, but with segments of different lengths.

A block copolymer is prepared as in Example 1, using:

|  | Grams |
|---|---|
| $CH_3CCl_3$ solvent | 15 |
| Tert-butyl hydroperoxide initiator | 0.005 |
| $C_8F_{17}SO_2N(C_2H_5)C_2H_4O_2CC(CH_3)=CH_2$ | 2.5 |
| Tetraethylene glycol dimethacrylate-$H_2S$ prepolymer | 2.5 |

The prepolymer has the average composition:

The prepolymer has an average molecular weight of 42,000, and an inherent viscosity in $CHCl_3$ at 25° C. of 0.52. A 90 weight percent yield of block copolymer (FHF) is obtained with the representative average composition

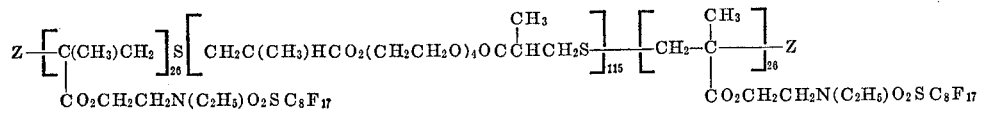

The cast film of the polymer is clear and somewhat rubbery. The polymer is used to treat a 50/50 polyester/cotton twill as in Example 1 which then shows the following properties:

| Property | Polymer of— | |
|---|---|---|
|  | Example 3 | Example 1 |
| Initial ratings: |  |  |
| Oil | 90 | 100 |
| Spray | 100 | 70 |
| After 5 launderings: |  |  |
| Oil | 50 | 80 |
| Spray | 50 | 50 |
| $\Delta K/S$ laundered at: |  |  |
| 60° C | 0.67 | 0.04 |
| 99° C | 0.08 |  |

The copolymer of this example shows two glass temperatures, one at about −49° C., characteristic of the "H" segment, and one at about +60° C., characteristic of the "F" segment. It will be noted that stain removal by laundering at 60° C. is incomplete, while laundering at 99° C., above the higher glass temperature, is quite satisfactory.

It should also be noted that contact angle measurement (see Example 4 below) shows inadequate oleophobicity in water at 23° C., and excellent oleophobicity at 80° C. Recovery of oleophobicity in air after drying at 23° C. subsequent to aqueous exposure at 80° C. is poor; recovery after heating in air at 80° C. is complete. This demonstrates that reversibility of surface characteristics is facilitated by operation near or above the higher glass temperature, in agreement with the theory that such reversibility is connected with high relative segmental mobility such as is known to obtain above glass temperatures.

EXAMPLE 4

This example serves to compare the oleophobic and hydrophobic characteristics of:

Polymer
designation—     Polymer composition

D _____ The block copolymer of Example 1.
E _____ The block copolymer of Example 3.
F _____ The homopolymer corresponding to the "F" segment of Polymer D.

(Poly $C_8F_{17}SO_2N(C_2H_5)$
$CH_2CH_2O_2CC(CH_3)=CH_2$)

G _____ A graft copolymer comprising the "F" segment of Polymer D, but with another segment free of hydrophilic polar units.

Polymer F is prepared in accordance with Example IIIA of U.S. 3,068,187; Polymer G in accordance with Example VI of the same reference. The polymers were deposited on 50/50 polyester/cotton fabric in standard fashion and the properties evaluated as shown below.

|  | D | E | F | G |
|---|---|---|---|---|
| Initial ratings: |  |  |  |  |
| Oil | 100 | 90 | 90 | 100 |
| Spray | 70 | 100 | 100 | 100 |
| After 5 launderings: |  |  |  |  |
| Oil | 80 | 50 | 0 | 80 |
| Spray | 50 | 50 | 50 | 90 |
| $\Delta K/S$ | 0.04 | 0.67 | 0.58 | 0.45 |

Films of the four polymers were deposited on polyester film and contact angles determined as previously described. The results are shown in the following table:

| Determination | Polymer | | | |
|---|---|---|---|---|
|  | D | E | F | G |
|  | Contact angle, degree | | | |
| (1) Initially, in air at 23° C.: |  |  |  |  |
| Hexadecane | 70 | 64 | 65 | 67 |
| Water | 97 | 107 | 115 | 116 |
| (2) In water at 23° C.: Hexadecane | 106 | 54 | 45 | 55 |
| (3) In air at 23° C., after (2) and drying at 23° C.: |  |  |  |  |
| Hexadecane | 72 | 59 | 56 | 62 |
| Water | 81 | 105 | 98 | 107 |
| (4) In water at 80° C.: Hexadecane | 119 | 109 | 55 | 69 |
| (5) In air at 23° C., after (4), cooling in water and then drying at 23° C.: |  |  |  |  |
| Hexadecane | 74 | 42 | 58 | 58 |
| Water | 81 | 56 | 107 | 91 |
| (6) In air at 23° C., after (4), and heating in air at 80° C. for 10 minutes: |  |  |  |  |
| Hexadecane | 70 | 64 | 64 | 67 |
| Water | 93 | 104 | 109 | 112 |

The two above tables, in conjunction with the data in the preceding Example 3, demonstrate Polymer D, a block copolymer of this invention, to be oleophobic and hydrophobic in air, and at the same time to be oleophobic and hydrophilic in water over the temperature range of at least 23–80° C. and consequently to show good oily stain-releasing characteristics during laundering.

In the case of Polymer E, segmental mobility is apparently too restricted at temperatures below 60° C. (the glass transition temperature of the "F" segment therein) to permit conversion of the surface of the hydrophilic state on immersion in water at lower temperatures. As a result the surface behavior in water at 23° and 60° C. is essentially oleophilic, as exemplified by the low contact angle of n-hexadecane and the poor soil release obtained on laundering treated fabric at these respective temperatures. At 80° and 99° C. in water the requisite segmental mobility is available and the surface assumes high degrees of hydrophilic and oleophobic character, as shown by the high contact angle of n-hexadecane and the good soil release obtained on laundering treated fabric at these respective temperatures. The reversibility of the surface character of Polymer E at temperatures exceeding the glass temperature is clearly demonstrated by the recovery of essentially the same contact angles for hexadecane and water after the polymer is exposed to water at 80° and then dried in air at 80°, Polymers F and G, lacking hydrophilic segments, are hydrophobic and oleophobic in air, but show relatively poor oleophobicity and very poor stain release in water, in complete conformance with the typical properties discussed for prior art oleophobic polymeric fabric treatments by Berch and Peper, previously referred to.

EXAMPLE 5

This example compares polymeric fabric treatments using a block copolymer of this invention alone and the block copolymer in conjunction with polymers corresponding to the individual copolymer segments. A fluoroaliphatic-radical containing homopolymer is prepared from a mixture of:

| | Grams |
|---|---|
| $C_8F_{17}SO_2N(C_2H_5)C_2H_4O_2CC(CH_3)=CH_2$ | 10 |
| $C_6H_5CF_3$ solvent | 30 |
| Benzoyl peroxide initiator | 0.05 |
| Dodecyl mercaptan modifier | 1.14 | polymerized at 75° for 16 hours. The block copolymer and the prepolymer correspond to those prepared in Example 1.

Pad baths are prepared using $C_6H_5CF_3$ and sufficient polymer (including prepolymer) to make up a 1 percent by weight solution. Fabrics are resin pretreated and, subsequent to padding, are dried 15 minutes at 160° C. Evaluation results are summarized in the table.

This thiol-terminated prepolymer (5.0 parts) and 5 parts of a suitable fluorinated monomer, i.e., N-ethyl-perfluorooctanesulfonamidoethyl methacrylate, in 30 parts of 1,1,1-trichloroethane containing about 0.0025 part of benzoin are charged to an ampoule and exposed for 16 hours to the light from a G.E. 275 w. sun lamp at a distance of 25 cm., after outgassing the solution frozen in liquid air by evacuation to 0.001 mm. Hg pressure. The resulting solution is slightly cloudy and on standing a small amount of solid material settles leaving a clear supernatant solution containing 22.8 percent of polymeric solids (theoretical 25 percent).

An air-dried film of this block copolymer is clear, soft and putty-like. After heating 10 minutes at 130° C., it is essentially unchanged. The polymer is soluble in acetone, methyl ethyl ketone, benzotrifluoride and 1,1,1-trichloroethane. It forms a milky dispersion in 1,1,2-trifluoro-trichloroethane and is essentially insoluble in water, heptane, methanol, and perchloroethylene.

The above-prepared polymer solution is diluted to 1 percent polymer solids with 1,1,1-trichloroethane and padded on white polyester taffeta and tan 50/50 polyester/cotton twill fabric at 40 pounds nip pressure (wet pick-up approximately 75 percent based on fabric weight). After padding, the fabrics are heated 5 minutes at 160° C. in an air-circulating oven.

TABLE

| | Column | | | | | | | | | | | |
|---|---|---|---|---|---|---|---|---|---|---|---|---|
| | 1 | | 2 | | 3 | | 4 | | 5 | | 6 | |
| Block copolymer, percent | 0 | | 1.0 | | 0.5 | | 0 | | 0 | | 0.5 | |
| Homopolymer, percent | 0 | | 0 | | 0.5 | | 1.0 | | 0.5 | | 0 | |
| Prepolymer, percent | 0 | | 0 | | 0 | | 0 | | 0.5 | | 0.5 | |
| Fabric[1] | 50/50 | 65/35 | 50/50 | 65/35 | 50/50 | 65/35 | 50/50 | 65/35 | 50/50 | 65/35 | 50/50 | 65/35 |
| Initial: | | | | | | | | | | | | |
| Oil | | | 100 | 100 | 90 | 90 | 90 | 90 | 100 | 100 | 120 | 110 |
| Spray | | | 80 | 70 | 100 | 100 | 100 | 100 | 100 | 100 | 70 | 70 |
| After 5 launderings: | | | | | | | | | | | | |
| Oil | | | 80 | 90 | 60 | 70 | 0 | 0 | 60 | 60 | 80 | 80 |
| Spray | | | 70 | 70 | 60 | 70 | 50 | 60 | 50 | 50 | 50 | 70 |
| $\Delta K/S$ | 0.34 | 1.10 | 0.02 | 0.08 | 0.13 | 0.51 | 0.58 | 1.31 | 0.20 | 0.52 | 0.05 | 0.09 |

[1] Resin pretreated.

The homopolymer is of lower molecular weight than used in commercial fabric treatment, in order to match the segment molecular weight in the segmented copolymer; if the usual high molecular weight material is used, initial rating may be somewhat better and stain release poorer.

Column 5, the mixture of homopolymer and prepolymer corresponding in both concentration and segment-length to the segmented copolymer of Column 2 shows better stain release than does the homopolymer alone (Column 4), but much poorer than the copolymer in which both units are united in a single polymer molecule.

EXAMPLE 6

This example shows preparation of a block copolymer by ultra-violet light initiation, its use on various fabrics, with and without crease-proof resin treatment.

In this example the prepolymer is a copolymer of tetraethylene glycol dimethacrylate and hydrogen sulfide having the same structure as in Example 1 and having a molecular weight of about 3200, corresponding to about 9 recurring organic residues separated by sulfur. The prepolymer contains 2.1 percent sulfhydryl groups and has an inherent viscosity in chloroform at 25° of 0.112.

| | Polyester | 50/50 |
|---|---|---|
| Initial ratings: | | |
| Oil | 120 | 110 |
| Spray | 50 | 70 |
| After one laundering and drying: | | |
| Oil | 100 | 90 |
| Spray | 50 | 50 |

Oil stains such as corn oil and dyed mineral oil are forced into the fabric by hand rubbing before laundering. These stains are completely removed by the laundering.

EXAMPLE 7

This example shows the use of several fluoroaliphatic monomers suitable for forming "F" segment structural units, combined into segments of varying length, and attached to segments of prepolymer of differing length.

Following the procedure of Example 6, a series of block copolymers is prepared. Two prepolymers are used, both based on tetramethylene glycol dimethacrylate chain-extended and terminated with $H_2S$; one copolymer is prepared with an average degree of polymerization (m) of 9, corresponding to an average molecular weight of about 3300, and the other an average degree of polymerization of about 20, corresponding to an average molecular weight of about 7400.

A general graphic representation of these particular block copolymers' composition is:

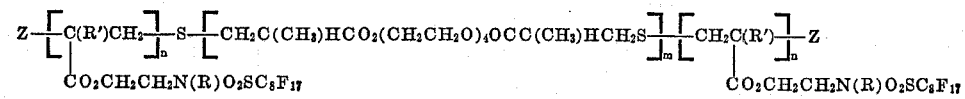

where $n$ equals average degree of polymerization of the "F" segment, $m$ equals average degree of polymerization of the "H" segment, R equals a lower alkyl radical, R' equals a hydrogen atom or a lower alkyl radical and Z is as before described. A summary of the polymers prepared is given in the table.

These block copolymers are dissolved in $CH_3CCl_3$ to form solutions containing 1 weight percent polymer solids to pad resin pretreated 50/50 polyester/cotton fabrics as in Example 1. The results of tests on the treated fabric are summarized in the table below.

| Polymer | Approx. wt. F:H | R | R' | $n$ | $m$ | Solution, percent found | Solids, theoretical | Solution appearance | Polymer film appearance |
|---|---|---|---|---|---|---|---|---|---|
| H | 1:1 | $C_2H_5$ | $CH_3$ | 2.3 | 9 | 22.1 | 25 | Clear (bit solid residue) | Clear, soft, putty-like. |
| I | 1:1 | $C_2H_5$ | $CH_3$ | 5.5 | 20 | 23.7 | 25 | Slightly hazy (no residue) | Same as A but somewhat firmer. |
| J | 1:1 | $C_3H_7$ | H | 2.1 | 9 | 20.4 | 25 | Clear (bit solid residue) | Clear, tacky rubber. |
| K | 1:1 | $C_2H_5$ | H | 2.3 | 9 | 22.1 | 25 | Slightly cloudy (no residue) | Slightly cloudy, tacky soft rubber. |
| L | 2:1 | $C_2H_5$ | H | 5.2 | 9 | 19.7 | 20 | Clear (bit residue) | Clear, slightly tacky, soft putty-like. |
| M | 2:1 | $C_2H_5$ | H | 11 | 20 | 19.2 | 20 | Slightly cloudy | Clear, soft putty. |
| N | 1:1 | $CH_3$ | H | 2.4 | 9 | 17.8 | 20 | Clear when hot; gels (crystallizes) on cooling. | Clear, waxy. |
| O | 1:1 | $CH_3$ | H | 5 | 20 | 16.5 | 20 | Cloudy | Do. |
| P | 1:1 | $CH_3$ | $CH_3$ | 5.3 | 20 | 17.8 | 20 | ....do | Slightly cloudy, waxy. |
| Q [1] | 1:1 | $C_2H_5$ | $CH_3$ |  | 9 | 23.0 | 25 | Clear (bit residue) | Clear, slightly tacky, soft. |

[1] The "F" segment in Polymer Q is a random copolymer prepared from a mixture comprising 95 weight percent of the fluoroaliphatic methacrylate and 5 percent butyl acrylate.

Polymers N, M and O are solids having crystalline melting point of about 90–100° C., as determined by Differential Thermal Analysis. These three polymers are dissolved in $CH_3CCl_3$ at above 70° C. for fabric treatment.

Solutions are diluted to 1 percent polymer solids with $CHCCl$ and padded on 50/50 polyester/cotton fabric previously treated with crease-proofing resin and catalyst and air dried. Treated fabrics are cured for 15 minutes at 166° C. The following properties are obtained:

| | Initial | | After 1 laundering and tumble drying | | | After 5 launderings and tumble drying | |
|---|---|---|---|---|---|---|---|
| Block copolymer | Oil | Spray | Oil | Spray | $\Delta K/S$ | Oil | Spray |
| H | 110 | 80 | 100 | 70 | .02 | 80 | 50 |
| I | 100 | 100 | 80 | 70 | .03 | 60 | 70 |
| J | 110 | 50 | 100 | 50 | .01 | 80 | 50 |
| K | 130 | 50 | 120 | 50 | .02 | 80 | 50 |
| L | 120 | 70 | 110 | 70 | .02 | 90 | |
| M | 120 | 90 | 100 | 80 | .03 | 80 | |
| N | 130 | 70 | 110 | 70 | .02 | 70 | |
| O | 110 | 90 | 80 | 80 | .05 | 70 | |
| P | 100 | 100 | 80 | 70 | .05 | 70 | |
| Q | 110 | 80 | 100 | 70 | .02 | 70 | 50 |

| | | Polymer | | | | |
|---|---|---|---|---|---|---|
| Property | R | S | T | U | V | W |
| Initial ratings: | | | | | | |
| Oil | 130 | 130 | 100 | 140 | 90 | 150 |
| Spray | 70 | 70 | 70 | 70 | 80 | 70 |
| After 5 launderings: | | | | | | |
| Oil | 100 | 110 | 80 | 110 | 80 | 130 |
| Spray | 50 | 50 | 50 | 50 | 70 | 50 |
| $\Delta K/S$ | 0.00 | 0.01 | 0.04 | 0.01 | 0.06 | 0.04 |
| Solvent uptake (wt. percent): | | | | | | |
| Water | 2.1 | 3.0 | 2.2 | 2.2 | 1.8 | 2.9 |
| Methanol | 18.5 | 24.0 | 15.0 | 16.2 | 14.5 | 18.2 |
| Cyclohexane | 2.4 | 5.5 | 4.8 | 3.0 | 2.0 | 6.5 |

| | Solvent uptake (wt. percent) | | |
|---|---|---|---|
| Copolymer | $H_2O$ | $CH_3OH$ | Cyclo-$C_6H_{12}$ |
| H | 1.8 | 11.9 | 2.1 |
| J | | 17.0 | 6.3 |
| K | 2.9 | 19.8 | 4.6 |
| M | 1.5 | 11.8 | |
| N | 2.8 | 17.2 | 4.2 |
| Q | 1.6 | 15.7 | 3.6 |

EXAMPLE 8

This example illustrates the preparation and properties of several copolymers based on the combination of a common "H" segment with different "F" segments, varying in composition, "F" segment length (i.e. degree of polymerization, $n$), weight ratio of "F" segment to "H" segment, and the like.

Polymers are prepared by the addition polymerization of fluoroaliphatic monomers in the presence of the prepolymer of Example 1. Reaction is initiated by tert butyl hydroperoxide according to the procedure of Example 1, except for T which was initiated by ultra-violet light and benzoin according to the procedure of Example 6.

| Polymers | | Approximate wt. F:H | $n$ |
|---|---|---|---|
| R | $C_8F_{17}SO_2N(CH_3)C_2H_4O_2CCH=CH_2$ | 2:3 | 2.2 |
| S | $C_8F_{17}SO_2N(C_2H_5)C_2H_4O_2CCH=CH_2$ | 2:3 | 2.1 |
| T | $C_7F_{15}CH_2O_2CC(CH_3)=CH_2$ | 1:1 | 4.3 |
| U | 95% $C_8F_{17}SO_2N(CH_3)C_2H_4O_2CCH=CH_2$ plus 5% $C_4H_9O_2CCH=CH_2$ | 1:1 | |
| V | $C_3F_7CH_2O_2CC(CH_3)=CH_2$ | 1:1 | 7.5 |
| W | $C_8F_{17}SO_2N(CH_3)C_{11}H_{22}O_2CCH=CH_2$ | 1:1 | 2.5 |

EXAMPLE 9

This example illustrates the effect of reacting a common "H" segment with a common fluoroaliphatic monomer in varying weight ratios and the effect of different polymerization initiators on a given reaction mixture. The fluoroaliphatic monomer used is

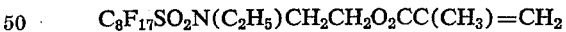
$$C_8F_{17}SO_2N(C_2H_5)CH_2CH_2O_2CC(CH_3)=CH_2$$

The "H" segment is derived from the commercially available thiol-terminated polyether represented by the formula:

$$R''[O(C_3H_6O)_qCH_2CHOHCH_2SH]_p$$

wherein R'' represents a polyvalent lower aliphatic organic radical free of substituents reactive with free radicals, $q$ represents a number with an average value of 20 to 25, and $p$ represents a number with an average value of 2 to 3. The material is available under the trade name "Dion Polymercaptan 1002" from Diamond Alkali Company.

The latter is employed in three relative proportions by weight 2:1, 1:1, and 1:2 with respect to fluoroaliphatic monomer, the lots being designated X, Y and Z respectively. In each case, 0.05 percent of benzoin based on fluoroaliphatic monomer is used. The respective starting materials are dissolved in $CH_3CCl_3$ to form solutions containing about 25 percent by weight of reactants. Exposure to ultraviolet light at 75° C. is for 16 hours. In another run, designated AA, the same proportions are used as in lot Z, except that 0.15% tert.-butylhydroperoxide is substituted for the benzoin and the mixture is rotated in a 75° C. water bath for 48 hours. The four polymers are tested on 50/50 polyester/cotton fabric, initially and after 5 launderings with drying after the last laundering, with the results shown in the table.

from 1 percent solution in benzotrifluoride. The treated swatches are tested as shown below.

|  | Original copolymer | | Grafted copolymer | |
| --- | --- | --- | --- | --- |
|  | 50/50 | 65/35 | 50/50 | 65/35 |
| Initial ratings: | | | | |
| Oil | 90 | 90 | 100 | 100 |
| Spray | 100 | 100 | 70 | 70 |
| After 5 launderings: | | | | |
| Oil | 60 | 60 | 60 | 50 |
| Spray | 80 | 80 | 50 | 50 |
| $\Delta K/S$ | 0.61 | 0.90 | 0.02 | 0.11 |

TABLE

| Block copolymer | Initial ratings | | | After 5 launderings | | Solvent uptake (wt. percent) | | |
| --- | --- | --- | --- | --- | --- | --- | --- | --- |
|  | Oil | Spray | $\Delta K/S$ | Oil | Spray | $H_2O$ | $CH_3OH$ | Cyclo hexan |
| X | 120 | 80 | 0.10 | 80 | 50 | 3.9 | 50.7 | 71.3 |
| Y | 110 | 80 | 0.04 | 80 | 50 | 2.7 | 40.1 | 50.5 |
| Z | 100 | 100 | 0.08 | 80 | 70 | 1.8 | 24.3 | 29.2 |
| AA | 100 | 100 | 0.07 | 80 | 50 | 1.8 | 24.3 | 29.2 |

EXAMPLE 10

This example illustrates the preparation and use of a segmented copolymer in which the main chain is an "F" segment to which are grafted several "H" segments through

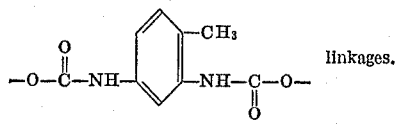 linkages.

Part I

A 40 ml. vial is charged with: 4.5 grams of N-ethylperfluorooctanesulfonamidoethyl methacrylate, 0.5 gram of 2-hydroxypropyl methacrylate, 0.025 gram of t-dodecyl mercaptan, 0.5 gram of benzoyl peroxide and 15 grams of benzotrifluoride. The vial is purged with nitrogen and sealed. It is then heated with agitation at 75° C. for 16 hours. The copolymer is isolated by precipitation, washing thoroughly with methanol and drying. A sample of the polymer shows a strong hydroxyl absorption peak at 2.8 microns in the infrared.

Part II

A mixture of 10 grams of commercial polyoxyethyleneglycol monomethyl ether with an average molecular weight of about 750, 2.32 grams of 2,4-toluene diisocyanate and 110.9 grams of benzotrifluoride is charged to a 250 ml. flask fitted with reflux condenser, gas inlet tube, magnetic stirrer and thermometer. The reaction mixture is heated and stirred under a slow stream of pure nitrogen at 60° C. for 20 hours. At the end of this time, titration shows 5.06 percent isocyanate, corresponding to an isocyanate equivalent weight of 830. This material may be represented by the approximate average formula

Part III.—Preparation of graft copolymer

A mixture of 12.65 grams of 23.7% solution of the (90:10) copolymer of Part I (0.002 equivalent), 17.30 grams (0.002 equivalent) of a 10 percent solution of the reaction product of Part II and 0.008 gram of phenyl mercuric acetate is charged to a 250 ml. flask fitted with condenser, gas inlet tube, magnetic stirrer and thermometer. The reaction mixture is heated and stirred under a slow stream of pure nitrogen at 80° C. for 16 hours, at which time isocyanate groups are not found by infrared spectroscopy.

The copolymer is translucent and somewhat waxy as a dried cast film.

The copolymer prepared in Part I and the segmented graft copolymer prepared above are applied to resin pretreated 50/50 and 65/35 polyester/cotton twill swatches

EXAMPLE 11

This example illustrates the case in which the "H" segment of a block copolymer is in itself a graft copolymer.

A block copolymer (5 g.) prepared as in Lot AA of Example 9, is reacted with 0.62 g. of

(from Example 10) and 0.1 g. phenyl mercuric acetate dissolved in a mixture of about 15 g. of $CH_3CCl_3$ and 6 g. of $C_6H_5CF_3$ for 65 hours at 75° C. After reaction —NCO groups are not observable in the infrared spectrum of the product and it is therefore considered that there is complete reaction of isocyanate and pendent —OH groups of the block copolymer "H" segment. When tested on fabric, the repellency properties are similar to Lot AA, but the cleanability is improved.

EXAMPLE 12

This example describes the preparation and properties of block copolymers comprising an "F" segment from a common fluoroaliphatic monomer,

combined with various "H" segments based on polyoxyalkylene glycols.

Preparation of polyoxyethyleneglycol 300 dibenzenesulfonate (precursor preparation)

To a 5 liter 3-neck round-bottom flask fitted with a stirrer, thermometer, and a dropping funnel is charged 1200 g. of anhydrous polyoxyethyleneglycol of average molecular weight 300, 600 g. of toluene and 820 g. of triethylamine. A total of 1433 g. of benzenesulfonyl chloride is added dropwise over a 3 hour period while stirring the flask and maintaining the reaction temperature at 25° by external cooling. After 24 hours, the reaction mixture is filtered to remove the precipitated triethylamine hydrochloride and the filter cake is washed with a small amount of toluene. The combined filtrate is stirred with 200 g. $NaHCO_3$ solid, then refiltered to remove all solids. The toluene is removed by reduced pressure distillation (20 mm.) at a maximum temperature of 45°. The yield is 2310 g. of polyoxyethyleneglycol 300 dibenzenesulfonate A similar procedure is employed to make polyoxyethyleneglycol 600 dibenzenesulfonate (saponification equivalent 488) using appropriately adjusted ratios of reactants.

Preparation of sulfhydryl terminated polyoxyethyleneglycol 300-bisphenol A telomer (Prepolymer a)

In a 250 ml. 3-neck round-bottom flask fitted with a stirrer, heating mantle, and dropping funnel and condenser is placed 30.5 g. of polyoxyethyleneglycol dibenzenesulfonate with a saponification equivalent of 305, 9.13 g. of bisphenol A

[HOC$_6$H$_4$C(CH$_3$)$_2$C$_6$H$_4$OH]

and 50 ml. of isopropyl alcohol. The reaction mixture is brought to reflux with stirring and 15.7 ml. of 5.10 N NaOCH$_3$ in CH$_3$OH is added dropwise over a one-hour period. After addition is complete, the reaction mixture is refluxed and stirred one hour longer. The solution is cooled to 5° C. and an additional 10 ml. of the NaOCH$_3$ solution in CH$_3$OH is added. The solution is saturated with H$_2$S at atmospheric pressure, then refluxed one hour longer. The cooled solution is acidified with 10 ml. of conc. HCl then poured into 200 ml. of H$_2$O. The product is extracted into 75 ml. of methylene chloride. The methylene chloride is washed with 10 ml. of water, dried over MgSO$_4$, then the solvent removed under reduced pressure to leave a viscous residue of the telomer of the average composition:

HS$\{$(CH$_2$CH$_2$O)$_q$C$_6$H$_4$C(CH$_3$)$_2$C$_6$H$_4$O$\}_m$
(CH$_2$CH$_2$O)$_{q-1}$CH$_2$CH$_2$SH where $q$ represents a number with an average value of about 6.8 and $m$ represents a number with an average value of about 4

Preparation of sulfhydryl terminated polyoxyethyleneglycol 600-bisphenol A prepolymer (Prepolymer b)

In a 250 ml. round-bottom flask fitted with a stirrer, condenser, thermometer, heating mantle, and dropping funnel is placed 24.4 g. of the dibenzenesulfonate ester of polyoxyethyleneglycol of average molecular weight 600. This ester has a saponification equivalent of 488. To the flask is charged 4.56 g. of bisphenol A and 100 ml. of isopropanol. The reaction mixture is brought to reflux and blanketed with N$_2$. Then 8.25 ml. of 4.58 N NaOCH$_3$ in CH$_3$OH is added dropwise over a one hour period. The reaction mixture is refluxed an additional hour, then cooled to 5° C. 5 ml. of NaOCH$_3$ in CH$_3$OH is then added and the solution is saturated with H$_2$S. The solution is brought to reflux for 3.5 hours.

The cooled solution is acidified with 5 ml. of conc. HCl, poured into 230 ml. of water in a separatory funnel and extracted into 100 ml. of chloroform. The aqueous layer is again extracted with 25 ml. of chloroform. The combined chloroform layers are washed once with 25 ml. of water, separated, and dried over anhydrous magnesium sulfate. The solution is concentrated under reduced pressure to leave a clear viscous oil. The equivalent weight based on sulfhydryl titration is 2075. The inherent viscosity, measured in a 1 percent CHCl$_3$ solution is .122. The structure is represented by:

HS$\{$(CH$_2$CH$_2$O)$_q$C$_6$H$_4$C(CH$_3$)$_2$C$_6$H$_4$O$\}_m$
(CH$_2$CH$_2$O)$_{q-1}$CH$_2$CH$_2$SH wherein $m$ represents a number with an average value of about 4.3 and q represents a number with an average value of about 13.6.

Preparation of sulfhydryl terminated urethane of polyoxyethylene glycol-toluene diisocyanate prepolymer (Prepolymer c)

In a 1 ml. 3-neck round-bottom flask equipped with magnetic stirrer, still head, thermometer and heating mantle is placed 120 g. of polyoxyethyleneglycol of an average molecular weight of 600 and 30 ml. of toluene. 25 ml. of toluene is then distilled to remove traces of water. The still head is changed for a reflux condenser and 55 ml. of dry tetrahydrofuran, 100 mg. of phenylmercuric acetate and 3.84 g. of toluene diisocyanate are charged. The solution is refluxed under a dry nitrogen atmosphere for one hour. The solution is cooled and 2.0 g. of 1,2-ethanedithiol and 0.5 g. of triethylamine are added. The solution is then stirred and refluxed an additional hour under dry N$_2$. The reaction mixture is cooled to room temperature and acidified with 0.8 ml. of conc. HCl. Most of the tetrahydrofuran is removed under reduced pressure and the residue poured into water. The aqueous phase is extracted twice with 50 ml. aliquots of chloroform. The combined chloroform phase is washed twice with 20 ml. of a saturated brine solution, dried over magnesium sulfate and concentrated under reduced pressure to yield a viscous residue. The sulfhydryl equivalent weight is 2410. The inherent viscosity is 0.23 measured in a 1 percent CHCl$_3$ solution at 23° C. The average structure is represented by the approximate equation:

HSC$_2$H$_4$SCONH$\{$C$_6$H$_3$(CH$_3$)NHCO$_2$(C$_2$H$_4$O)$_q$
OCNH$\}_m$C$_6$H$_3$(CH$_3$)NHCOSC$_2$H$_4$SH wherein $m$ represents a number with an average value of about 6 and q represents a number with an average value of about 13.6.

Preparation of sulfhydryl terminated polyester of polyoxyethyleneglycol-terephthalic acid (Prepolymer d)

To a 100 ml. flask equipped with stirrer, still head, and heating mantle is charged 12.0 g. of polyoxyethyleneglycol of average molecular weight 600 and 50 ml. of toluene. About 10 ml. of toluene is removed by distillation to assure dryness of the reaction mixture. The still head is changed for a condenser with a drying tube and 4.88 g. of terephthaloyl chloride is added. The reaction mixture is heated to reflux for 30 hours until HCl evolution ceases. Then 0.75 g. of ethanedithiol is added and the mixture refluxed for 46 hours until HCl evolution ceases. The clear toluene solution is concentrated to a viscous light yellow resin of 14.97 g. This resin has an inherent viscosity of 0.223 measured in a 1 percent chloroform solution at 25.5° C. It has a sulfhydryl equivalent weight of 3240. The average structure may be represented by the approximate equation:

HSCH$_2$CH$_2$S$\{$COC$_6$H$_4$CO$_2$(CH$_2$CH$_2$O)$_q\}_m$
COC$_6$H$_4$COSCH$_2$CH$_2$SH wherein $m$ represents a number with an average value of about 8 and $q$ represents a number with an average value of about 13.6.

Preparation of a sulfhydryl terminated polyoxyethylene glycol 4000 (Prepolymer e)

40 g. of a commercial polyoxyethyleneglycol of average molecular weight about 4000 and 20 ml. of toluene are charged to a 250 ml. 3-neck flask equipped with a stirrer, inert gas inlet valve, and a condenser. The solution is heated to reflux temperature and the water present azeotropically removed. After cooling the solution to 80° C., 1.96 g. of maleic anhydride and 0.1 g. of stannous octoate, are added. The reactants are reheated to reflux temperature and allowed to react for 16 hours under an argon atmosphere. The product has an acid value of 28.5 and an infrared spectrum with absorption bands characteristic of maleic anhydride-capped polyoxyethyleneglyco. 1.88 g. of 1,2-ethanedithiol and 9.3 g. of triethylenediamine are added to the maleic-capped glycol and reacted at 70° C. for 16 hours under an argon atmosphere. The product has a sulfhydryl equivalent weight of 2320 and an infrared spectrum showing no olefinic unsaturation. The above prepolymer is represented by the approximate average formula:

HSCH$_2$CH$_2$SO(CO$_2$H)HCH$_2$CO$_2$(CH$_2$CH$_2$O)$_{90}$
OCCH$_2$C(CO$_2$H)HSCH$_2$CH$_2$SH

Preparation of a dimercaptan terminated polyoxyalkylene glycol block copolymer (Prepolymer f)

To a 500 ml. 3-neck flask is charged 58.5 g. of a commercial block copolymer of ethylene oxide and propylene oxide whose average composition is represented by the formula:

HO(C$_2$H$_4$O)$_{23}$(C$_3$H$_6$O)$_{35}$(C$_2$H$_4$O)$_{23}$H and 150 ml. of toluene. 100 ml. of toluene is distilled to remove traces of moisture present. 100 g. of tetrahydrofuran, 7.95 g. of benzene sulfonyl chloride, and 4.51 g. of triethylamine are added and the reactants stirred for 16 hours at room temperature.

After removal of most of the tetrahydrofuran by stripping, 50 ml. of water is added and the polymer extracted with dichloromethane. The polymer solution is dried with anhydrous $MgSO_4$ and the dichloromethane removed by vacuum stripping.

The dibenzene sulfonate is added to 125 ml. of methanol containing approximately 15 g. of NaSH. The mixture is heated to reflux and the reaction allowed to proceed at that temperature for 4 hours. The methanol solution is then diluted with water and the SH-terminated polyoxyalkylene ether extracted with dichloromethane. The prepolymer has a sulfhydryl equivalent weight of 5800. This high molecular weight indicates that the product is a mixture containing in addition to the dimercaptan:

$$HS(C_2H_4O)_{23}(C_3H_6O)_{35}(C_2H_4O)_{22}C_2H_4SH$$

some partially reacted material:

$$HS(C_2H_4O)_{23}(C_3H_6O)_{35}(C_2H_4O)_{23}H$$

and some coupled product:

$$HS\text{-}[(C_2H_4O)_{23}(C_2H_6O)_{35}(C_2H_4O)_{22}C_2H_4S\text{-}]_rH$$

wherein $r$ is an integer with an average value of 2 to 3.

Preparation of block copolymers

Each of the above described Prepolymers a–f is used to prepare a block copolymer by reaction with an equal weight of $$C_8F_{17}SO_2N(C_2H_5)CH_2CH_2O_2CC(CH_3)=CH_2$$

and the polymer used to treat fabric in accordance with the procedures of Example 1, except that the reaction involving Prepolymer c is done in acetone and the resulting solution is diluted with additional acetone to form a 1 percent solution for padding. The results are summarized in the following table:

omer, previously washed and dried, is added dropwise over a 45 minute period, and heating and agitation continued for an additional 45 minutes. The resulting solution has the deep red color characteristic of "living" polystyrene.

Into a second flask is placed 700 ml. of purified toluene and 80 g. of $$C_7F_{15}CH_2O_2CC(CH_3)=CH_2$$

monomer. The contents are cooled to −32° C. and the "living" polystyrene solution added under argon to the monomer solution. Stirring is continued at −30° C. for 30 minutes and the contents then allowed to warm to room temperature. A 93 percent yield of polymer is obtained. The polymer is soluble in tetrahydrofuran carbon tetrachloride and trichloroethane. Completely clear, brittle films are cast from these solutions.

Preparation CC.—20 percent sulfonated segmented copolymer

To a vigorously stirred solution of 10 g. of the above segmented copolymer dissolved in 500 mls. of chloroform under dried nitrogen is added a solution of 0.4 ml. of liquid $SO_3$ dissolved in 100 ml. of chloroform. About 15 minutes is required for addition. The mixture is allowed to stir for an additional hour, the polymer is precipitated by the addition of isopropyl ether and washed twice with isopropyl ether. 8 g. of air-dried crude polymer is obtained, which is further purified by washing with a 95:5 mixture of isopropyl ether:dimethyl formamide. Analysis by titration with standard base shows an approximate degree of sulfonation of 20 percent, i.e. about 1 aromatic ring in 5 is sulfonated.

Preparation DD.—40 percent sulfonated segmented copolymer

In a similar manner to Preparation CC, except that 1.0 ml. of liquid $SO_3$ dissolved in chloroform is added to the copolymer solution, a 40 percent sulfonated copolymer

TABLE

| | Block copolymer from "H" segment | | | | | | | | | | | |
|---|---|---|---|---|---|---|---|---|---|---|---|---|
| | a | | b | | c | | d | | e | | f | |
| Fabric | 50/50 | 65/35 | 50/50 | 65/35 | 50/50 | 65/35 | 50/50 | 65/35 | 50/50 | 65/35 | 50/50 | 65/35 |
| Initial ratings: | | | | | | | | | | | | |
| Oil | 120 | 120 | 110 | 110 | 120 | 120 | 100 | 100 | 100 | 100 | 90 | 100 |
| Spray | 50 | 50 | 80 | 80 | 70 | 70 | 70 | 70 | 70 | 80 | 80 | 90 |
| After 5 launderings: | | | | | | | | | | | | |
| Oil | 60 | 90 | 70 | 70 | 90 | 80 | 70 | 80 | 80 | 80 | 70 | 70 |
| Spray | 50 | 70 | 50 | 50 | 50 | 70 | 50 | 50 | 50 | 50 | 50 | 50 |
| $\Delta K/S$ | 0.07 | 0.06 | 0.00 | 0.05 | 0.04 | 0.14 | 0.01 | 0.06 | 0.04 | 0.08 | 0.04 | 0.12 |

It is believed that the high molecular weight of the "H" segment from Prepolymer e results in inadequate recovery of stain-resistant properties during drying at 60° C. The data after laundering for the sample from e were obtained after heating for 2 minutes at 166° C. following the usual tumble-drying. Solvent uptake is determined for Polymer b and is (in weight percents) 12.0 for water, 20.8 for methanol and 3.7 for cyclohexane.

The sample from Prepolymer f, in consequence of the method of preparing the prepolymer, comprises a mixture of block copolymers corresponding to the prepolymer species present.

EXAMPLE 13

This example shows the preparation and evaluation of a segmented copolymer which is prepared, and subsequently converted by chemical reaction to an autoadaptable "F"–"H" segmented copolymer.

Preparation BB.—Segmented copolymer

A "living" polystyrene block is prepared in a 2 liter 3-neck flask equipped with stirrer, thermometer, dropping funnel, and heating and cooling facilities. 7.1 ml. of a 2.27 N butyl lithium solution in hexane is added to 800 ml. of toluene previously dried and distilled under argon. The solution is heated to 50° C., 80 g. of styrene monis prepared. Analysis indicates a degree of sulfonation in Polymer DD of 42 percent, i.e. about 2 aromatic units out of 5 are sulfonated.

1 percent solutions in 95:5 dimethyl formamide:water are prepared from each of the three above preparations and applied in a pad bath to resin-pretreated fabric. Test results are indicated in the table.

TABLE

| | Polymer | | | | | |
|---|---|---|---|---|---|---|
| | BB | | CC | | DD | |
| Fabric | 50/50 | 65/35 | 50/50 | 65/35 | 50/50 | 65/35 |
| Initial ratings: | | | | | | |
| Oil | 90 | 100 | 100 | 100 | 70 | 50 |
| Spray | 100 | 100 | 80 | 80 | 70 | 70 |
| $\Delta K/S$ | 0.40 | 1.72 | 0.26 | 0.58 | 0.07 | 0.14 |

The results show that the unsulfonated (free of polar groups) segmented copolymer has very poor stain release, and that stain release improves as the proportion of polar —$SO_3H$ groups increases. Sodium salts of the sulfonated segmented copolymer produced very similar results to those obtained from the acid form.

EXAMPLE 14

This example illustrates a Pilot Plant preparation of one autoadaptable block copolymer.

Equipment

For this experiment, a 5-gallon glass-lined reactor fitted with a thermo-well, an agitator, a valved inlet tube, a bottom drain, a connection to a vacuum source, and an insulated jacket for heating and cooling is used.

Prepolymer preparation

The following reactants are charged to the reactor:

| | Parts |
|---|---|
| Tetraethyleneglycol dimethacrylate | 20 |
| Triethylene diamine catalyst | 0.30 |
| Phenothiazine polymerization inhibitor | 0.02 |
| Hydrogen sulfide | 2.56 |

Three-quarters of the hydrogen sulfide is dissolved in the liquid reactants. The mixture is then heated to 130° C. for about 4 hours, until the bulk viscosity of a sample reaches 100 cps. measured at 80° C. The remainder of the $H_2S$ is then added to convert terminal vinyl groups to terminal mercaptan. The mixture is maintained at 130° C. for an additional 3 hours. The reactor is then evacuated to about 50 mm. Hg for 1 hour. The vacuum is released, 0.13 part of glacial acetic acid added to neutralize the amine catalyst and agitation continued for ½ hour. The product is drained through a felt cartridge filter. The bulk viscosity is 323 cps. at 80° C., 7,620 cps. at 25° C. The product has the following approximate average structure:

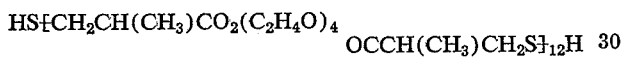

$HS\{CH_2CH(CH_3)CO_2(C_2H_4O)_4$
$\quad\quad OCCH(CH_3)CH_2S\}_{12}H$

Block copolymer preparation

The reactor is charged with

| | Parts |
|---|---|
| Prepolymer product from above | 6 |
| $C_8F_{17}SO_2N(CH_3)CH_2CH_2O_2CCH=CH_2$ | 6 |
| Methyl isobutyl ketone solvent | 24 |
| t-Butyl hydroperoxide initiator | 0.018 |

Agitation is started and the reactor evacuated to about 60 mm. Hg, pressurized with dry nitrogen to about 1260 mm. Hg and the evacuation-purge cycle repeated 4 times. A final nitrogen pressure of about 860 mm. is applied, the batch heated to 75° C. and maintained at this temperature for 16 hours. The batch is then cooled and drained through a filter.

The resulting solution contains 30.3 percent by weight of polymer solids, corresponding to a yield of 89.4 percent of theoretical.

Fabric treatment and evaluation

A portion of the copolymer solution obtained above is further diluted with methyl isobutyl ketone to 1 percent polymer solids to prepare a pad bath and evaluated in the standard manner with the results shown in the table below:

| Fabric | 50/50 | 65/35 |
|---|---|---|
| Initial ratings: | | |
| Oil | 130 | 130 |
| Spray | 70 | 70 |
| After 5 launderings: | | |
| Oil | 100 | 90 |
| Spray | 50 | 50 |
| ΔK/S | 0.05 | 0.06 |
| Visual rating | 5 | 5 |

EXAMPLE 15

This example shows comparison between properties of fabrics having various weights of applied fluorine in fluoroaliphatic radical, in accordance with the invention, as compared to fabrics treated with a prepolymer free from fluoroaliphatic groups.

The fluoroaliphatic group containing polymer is prepared by the procedure of Example 14 from N-methyl perfluorooctanesulfonamidoethyl acrylate and prepolymer prepared as above using ethyl acetate as solvent and three times the proportion of catalyst. The resulting solution of polymer is evaporated to about 55 percent solids content and emulsified in water using

$C_8F_{17}SO_2NHC_3H_6N^+(CH_3)_3Cl^-$ as emulsifying agent to give final emulsion containing 30 parts by weight polymer solids, 45.5 parts of water, 24.5 parts of ethyl acetate and 1.5 parts of emulsifying agent. A comparable emulsion is prepared from the prepolymer alone.

Pad baths are prepared from the above emulsions, as in Example 2(C) using the same resin system, in which polymer, or prepolymer concentrations are varied and which contain additionally in each case 0.1 percent isooctylphenyl polyethoxyethanol as a wetting agent. Padding is at 20 p.s.i. nip pressure at the polymer concentrations indicated in the table below to give about 50% wet pickup. Treated fabrics are cured 10 minutes at 166° C. Fabrics employed are a tan 65/35 polyester/cotton poplin, a gold 50/50 polyester/cotton twill and a gray 65/35 polyester/cotton poplin. Each is rated for oil repellency before and again after 5 launderings and for cleanability from rubbed-in mineral oil (Nujol) stains, also before and after 5 launderings. Spray ratings are 60 before laundering on the gray poplin samples treated at all levels with fluorine containing copolymers and zero when treated only with the prepolymer.

| | Oil heating | | Cleanability (mineral oil stain) | |
|---|---|---|---|---|
| | Initial | After 5 launderings | Initial | After 5 launderings |
| Prepolymer—3% level: | | | | |
| Tan poplin | ¹ 75 | 0 | 3 | 3.5 |
| Twill | ¹ 60 | 0 | 2.5 | 3 |
| Gray poplin | ¹ 65 | 0 | 3.5 | 2.5 |
| Copolymer—0.5% level: | | | | |
| Tan poplin | 115 | 50 | 4.5 | 3.5 |
| Twill | 110 | 50 | 4 | 4 |
| Gray poplin | 110 | 65 | 4.5 | 3.5 |
| 2% level: | | | | |
| Tan poplin | 120 | 105 | 4.5 | 4 |
| Twill | 110 | 105 | 4 | 4 |
| Gray poplin | 115 | 105 | 4.5 | 4.5 |
| 3% level: | | | | |
| Tan poplin | 125 | 110 | 4.5 | 4 |
| Twill | 115 | 110 | 5 | 4.5 |
| Gray poplin | 120 | 115 | 4.5 | 4.5 |

¹ Fugitive values due to emulsifier used in applying the polymer.

It will be seen that there is durable, oil repellency, which remains evident after five launderings, even at the lowest level at which fluorine-containing copolymer is applied. This is approximately between 0.1 and 0.15% fluorine on the weight of fabric. Cleanability is significant although not well retained after laundering. At a 2% level of copolymer application, oil repellency and cleanability have increased and become durable and are not greatly increased by further increase in the level of application.

Copolymer as described above is applied at a 1% level in combination with the same resin system in the pad bath to a basket woven blue fabric of 50/50 polyester/cotton blend (weight 10 ounces per square yard). After curing and repeated laundering the fabric is subjected to tests on its cleanability with respect to the removal of mineral oil and the extent to which oil spreads by wicking. In each case "oil rating" is 0 which means that oil penetrates within a short time. However, the wicking tests show a very clear durable benefit with respect to the spreading of oils.

The wicking test involves immersion at room temperature (ca. 25° C.) of one end of a 2.5 x 20 cm. test strip of the fabric in a pool of the oil to be employed and measuring the distance the oil rises above the meniscus of the oil after standing for one hour. An untreated comparison sample of the fabric rates 3 for cleanability from mineral oil and there is upward rise, i.e., wicking, of 7.6 cm. of both mineral oil and peanut oil. Results in centimeters with the treated fabric after the indicated launderings are summarized in the following table.

| Launderings [1] | Cleanability (mineral oil) | Wicking | |
|---|---|---|---|
| | | Peanut oil | Mineral oil |
| 5 | 4.5 | 0 | 0 |
| 10 | 4 | 0 | 0.6 |
| 25 | 3.5 | 1.3 | 3.8 |

[1] Followed by air drying at 25° C. rather than tumble drying.

EXAMPLE 16

A series of copolymers is prepared from the comonomers used in Example 15 in which the percent of fluorine-containing groups is varied from a barely perceptible level up to the level used in that example. These copolymers are designated by the weight percents of fluorine-containing monomer and of prepolymer as 50/50; 30/70; 20/80; 10/90; 5/95; and 2/98 and the prepolymer alone which is 0/100. These are prepared by essentially the same procedure as in Example 15 and applied in solution in ethyl acetate at such a level that 0.4 g. copolymer is picked up on 100 g. of fabric to swatches of the tan poplin used in Example 15, but previously treated with a crease resistant finish without curing. This treatment involves applying to the fabric an 11% solids content aqueous solution of the commercial finish used in Example 1 above, also containing 1.5% of zinc nitrate as catalyst. There is 50% by weight wet pickup (20 pound nip pressure). The swatches are dried at 70° C. for 10 minutes. After application of the fluorine-containing copolymers (or prepolymer) the swatches are further dried and heated at 166° C. for 10 minutes to cure the resin treatment.

Certain of the above copolymers are characterized with respect to external and internal oleophilicity and related properties as shown in the following table. Values for copolymers 30/70 and 20/80 are intermediate.

| | Copolymer | | | | |
|---|---|---|---|---|---|
| | 50/50 | 10/90 | 5/95 | 2/98 | 0/100 |
| Percent weight uptake at 23° C.: | | | | | |
| Water | 2.8 | 4.8 | 4.9 | 5.8 | |
| Methanol | 17.2 | 33.7 | 33.33 | 33.3 | |
| Cyclohexane | 4.2 | 6.7 | 6.5 | 6.4 | |
| Contact angle at 23° C.: | | | | | |
| Initial in air: | | | | | |
| Water [1] | 110 | 115 | 118 | 110 | |
| Hexadecane | 82 | 92 | 87 | 67 | 58 |
| Hexadecane under water | 112 | 125 | 128 | 135 | 9 |
| After drying, in air: | | | | | |
| Water [1] | 112 | 120 | 123 | 110 | 90 |
| Hexadecane | 78 | 80 | 82 | 58 | 50 |

[1] Instantaneous value measured as rapidly as possible.

Swatches of the above resin-treated tan poplin are prepared as noted above so that 0.4% of polymer by weight is deposited on the fabric. In addition at very low fluorine content in the copolymers, and in the case of the prepolymer, applications are also made at the fivefold level, i.e. 2 g. polymer per 100 grams of fabric or 2%. Tests on the wash and wear poplin are tabulated below. Weight of fluorine is calculated based on 50% fluorine in N-methyl perfluorooctanesulfonamidoethyl acrylate. The figure is actually slightly higher. The figure is also expressed as a percent.

An anti-wicking effect on oily stains is observed even at the lowest levels of fluorine applied, i.e. 0.004 to 0.01%. It will thus be seen that recognizable effects are obtained when the amount of fluorine containing copolymer provides at least 0.004% fluorine in the form of fluoroaliphatic radicals and preferably 0.01% of fluorine in the fabric. More preferred results are obtained when at least 0.02% of fluorine is provided on the fabric.

EXAMPLE 17

Segmented copolymers in which alkylpolyalkyleneoxy groups are grafted onto a carbon chain backbone are prepared by copolymerizing the acrylates (including methacrylates) with suitable fluoroaliphatic group containing vinyl monomers, e.g. the acrylate used in Examples 14 to 16 above. Suitable alkylpolyalkylene oxy alcohols are available commercially under the trade name Carbowax and are converted to the acrylates in an acid catalyzed esterification. Other graft polymers are shown in Example 10.

Acrylate preparation

A suitable glass flask fitted with codenser and mechanical agitator is charged with 100 parts of polyethylene glycol monomethyl ether of molecular weight about 700, 12 parts of acrylic acid, 80 parts of toluene and 0.05 part of phenothiazine as polymerization inhibitor. Agitation and heating are started, 1.5 parts of sulfuric acid is added to the refluxing solution and water is collected. The hot solution is decolorized with carbon, cooled, made alkaline with Ca(OH)$_2$ and filtered. An additional 0.01 part of phenothiazine is added and toluene is then removed under reduced pressure to leave the acrylate as a viscous residue. Saponification equivalent is 745. Infrared spectroscopy indicates the presence of acrylate ester groups and absence of hydroxyl groups.

Other acrylates and methacrylates are prepared by the same general procedure.

Copolymer preparation

A screw capped bottle is charged with 60 parts of N-methyl perfluorooctanesulfonamidoethyl acrylate, 50 parts of the methylpolyethyleneoxyethyl acrylate prepared above, 0.5 part of benzoyl peroxide and 223 parts of ethyl acetate and after flushing with oxygen-free nitrogen is sealed and agitated for 16 hours at 75° C. Conversion is about 95%.

A series of copolymers from the same reactants is prepared in ethyl acetate solution by varying proportions and are designated by their proportions (as in Example 16). They are isolated from solutions and their properties determined as in Example 16.

| Copolymer | Percent | | Initial | | After 5 launderings, oil | Cleanability from mineral oil | |
|---|---|---|---|---|---|---|---|
| | Polymer | Fluorine | Oil | Spray | | Initial | After 5 launderings |
| 50/50 | 0.4 | 0.1 | 135 | 60 | 95 | 4.5 | 4.5 |
| 30/70 | 0.4 | 0.06 | 135 | 50 | 80 | 4.5 | 4.5 |
| 20/80 | 0.4 | 0.04 | 130 | 50 | 70 | 4.5 | 4.5 |
| 10/90 | 0.4 | 0.02 | 110 | 60 | 80 | 4 | 3.5 |
| 10/90 | 2 | 0.10 | 150 | 60 | 140 | 5 | 5 |
| 5/95 | 0.4 | 0.01 | 0 | 50 | 0 | 3.5 | 3 |
| 5/95 | 2 | 0.05 | 130 | 60 | 110 | 5 | 5 |
| 2/98 | 0.4 | 0.004 | 0 | 0 | 0 | 3 | 3 |
| 2/98 | 2 | 0.02 | 70 | 50 | 60 | 4.5 | 4 |
| 0/100 | 0.4 | | 0 | 0 | 0 | 2 | 2.5 |
| 0/100 | 2 | | 0 | 0 | 0 | 3 | 3 |

| Co-polymer | Percent weight uptake at 23° C. | | | Contact angle at 23° C. | | | | |
|---|---|---|---|---|---|---|---|---|
| | | | | Initial in air | | | After drying in air | |
| | $H_2O$ | $CH_3OH$ | $c-C_6H_{12}$ | Water [1] | $C_{16}H_{34}$ | $C_{16}H_{34}$ water | Water [2] | $C_{16}H_{34}$ |
| 90/10 | 7.4 | 12.3 | 1.7 | 114 | 80 | [2] 73 | 114 | 78 |
| 80/20 | 14.8 | 18.4 | 1.9 | 113 | 80 | [2] 78 | 112 | 76 |
| 70/30 | | | | 112 | 79 | 130 | 114 | 77 |
| 65/35 | | 26.8 | 1.6 | 112 | 79 | 145 | 112 | 76 |
| 50/50 | 35.6 | 44.4 | 3.3 | 112 | 80 | 160 | 115 | 76 |
| 30/70 | 46.8 | 59.1 | 4.1 | 112 | 79 | 180 | 114 | 74 |

[1] Instantaneous value measured as rapidly as possible.
[2] This is below the critical value because the polymer is crystalline at 23° C. Above the melting point the value is above 90°., cf. Example 4(E).

These copolymers are applied to swatches of a tan 50/50 polyester/cotton steep twill previously treated with crease-resistant resin as in Example 16 above and then cured. The level of application is chosen to provide 0.4 g. of polymer per 100 grams of fabric. In addition to cleanability for mineral oil (abbreviated MO) stains, the swatches are tested for cleanability of an oily hair tonic (abbreviated HT) and of a used automobile crankcase oil or dirty motor oil (abbreviated DMO). This last is an especially severe test; actual values vary because no standardization of the dirty motor oil is possible.

| Copolymer | Fluorine, percent on fabric | Repellency | | | Cleanability | | |
|---|---|---|---|---|---|---|---|
| | | Initial | | After 5 launderings, oil | MO | DMO | HT |
| | | Oil | Spray | | | | |
| 90/10 | 0.18 | 105 | 90 | 70 | 4 | 1.5 | 4 |
| 80/20 | 0.16 | 120 | 95 | 95 | 5 | 2.5 | 4 |
| 70/30 | 0.14 | 125 | 70 | 95 | 5 | 4.5 | 4.5 |
| 65/35 | 0.13 | 120 | 70 | 95 | [1] 5 | 4.5 | [1] 5 |
| 60/40 | 0.12 | 110 | 60 | 50 | 4.5 | 4 | 5 |
| 50/50 | 0.10 | 110 | 60 | 50 | 4.5 | 4 | 5 |
| 30/70 | 0.06 | 100 | 50 | 0 | 5 | 4 | 5 |

[1] The same values are obtained after laundering 5 times, drying and restaining.

EXAMPLE 18

This example illustrates the effect of segment lengths in hybrid copolymers. Two hybrid copolymers are prepared as in Example 17 using the same fluoroaliphatic monomer and a polyethylene glycol methyl ether acrylate of molecular weight about 350 (short chain length) and a methacrylate of a long-chain methyl ether of about 5000 molecular weight. Although the weight proportions of the respective "H" segments in the copolymers (70%) are the same, the respective molar ratio of the copolymers in the reaction mixture changes sufficiently to give substantial "F" segments in the polymer containing the higher molecular weight polyethylene glycol segment.

The two copolymers are applied to resin treated fabrics used in Examples 16 and 17 (tan 50/50 polyester/cotton steep twill and tan 65/35 polyester/cotton poplin) and tested with the following results.

| Copolymer | Initial rating in | | After 5 launderings, oil | Cleanability | | |
|---|---|---|---|---|---|---|
| | Oil | Spray | | MO | DMO | HT |
| 350 acrylate: | | | | | | |
| Twill | 70 | 0 | 0 | 5 | 4.5 | 5 |
| Poplin | 85 | 0 | 0 | 4 | 3 | 4.5 |
| 5,000 methacrylate: | | | | | | |
| Twill | 110 | 60 | 75 | 4.5 | 3.5 | 4.5 |
| Poplin | 100 | 50 | 50 | 4 | 3 | 4 |

It will be noted that the treated fabrics are readily cleanable although the oil rating in the one case is not high after laundering.

EXAMPLE 19

Polyethylene glycol of average molecular weight about 3000 is converted to the dimethacrylate by azeotropically removing water over 8 to 10 hours from a refluxing agitated reaction mixture under nitrogen of 54 kg. of the glycol, 31.5 kg. of toluene, 3.2 kg. of methacrylic acid, 16 g. of phenothiazine and 570 g. of sulphuric acid. The toluene is then removed and the residue dissolved in trichloroethylene. After neutralization with 2.3 kg. of calcium hydroxide and filtration using 2.3 kg. of filter-acid, the filtrate is concentrated to residue at 10 mm. Hg pressure and 60° C., cast into a tray and allowed to solidify. The saponification equivalent is 1700 corresponding to an average molecular weight of about 3400, calculated as dimethacrylate.

A 60/40 copolymer is prepared in solution in 61 kg. of ethyl acetate from 12 kg. of N-methylperfluoroctanesulfonamidoethyl acrylate, 8.2 kg. of the above ester and 429 g. of n-octylmercaptan using 153 g. of azobisisobutyronitrile as initiator. Heating and agitation are maintained at 70° C. for 16 hours and the solution is then filtered through a 25 micron filter. There is about 90% conversion to polymer.

The polymer takes up 39.2% water, 38.8% methanol and 1.7% cyclohexane at 23° C. The contact angle of hexadecane under water is 180° and in air 79° and 76° before and after wetting respectively. The initial and after drying instantaneous contact angles of water in air are 118° and 112°.

Resin treated fabrics (tan steep twill and tan poplin) used in Examples 16 and 17 are padded with ethyl acetate solution of this polymer so that there is application of 0.4 g. of polymer per 100 g. of fabric which provides approximately 0.12 g. of combined fluorine per 100 g. of fabric. Results of tests show:

| | Twill | Poplin |
|---|---|---|
| Initial rating: | | |
| Oil | 125 | 130 |
| Spray | 60 | 60 |
| Rating after 5 launderings and drying: Oil | 70 | 90 |
| Cleanability—initial: | | |
| Mineral oil | 5 | 4.5 |
| Dirty motor oil | 5 | 3.5 |
| Hair tonic | 4 | 5 |
| After 5 launderings and drying: | | |
| Mineral oil | 5 | 5 |
| Hair tonic | 5 | 4.5 |

EXAMPLE 20

Hybrid copolymers are prepared from N-propyl prefluorooctanesulfonamidoethyl acrylate and 2-hydroxypropyl acrylate in weight ratio of 70/30 and 50/50 corresponding to approximate mole ratios of 1:2 and 1:5 respectively. The procedure used is to charge a total of 56 g. of the two monomers in the indicated weight ratio into a 500 ml. screw cap bottle with 84 g. of acetone, 0.08 g. t-dodecyl mercaptan and 0.112 g. of azobisisobutyronitrile. Air in the bottle is displaced by nitrogen and the bottle capped and agitated for 24 hours at 55° C. Conversion is greater than 90%.

The copolymers are padded on the resin-treated tan steep twill used in the above examples to the same 0.4% weight level and tested. Characterization of the polymers and of the treated fabrics is summarized in the following table.

| | 70/30 | 50/50 |
|---|---|---|
| Contact angles in air at 23° C.: | | |
| Initial: | | |
| Water | 120 | 111 |
| Hexadecane | 71 | 70 |
| After wetting and drying: | | |
| Water | 115 | 111 |
| Hexadecane | 65 | 65 |
| Hexadecane under water | 137 | 145 |
| Initial rating: | | |
| Oil | 80 | 70 |
| Spray | 60 | 75 |
| Rating after 5 launderings and drying: Oil | 80 | 70 |
| Cleanability: | | |
| Mineral oil | 5 | 5 |
| Dirty motor oil | 4 | 3 |
| Hair tonic | 5 | 5 |

Cleanability is retained after the laundering cycle when restrained and reevaluated.

EXAMPLE 21

This example illustrates the way in which oleophilic groups may be tolerated in copolymers to a limited extent. Copolymers are prepared from N-methylperfluorooctanesulfonamidoethyl acrylate and 2-hydroxypropyl acrylate in the weight ratio of 3:1 (molar ratio 2:3) in which there is an additional unit proportion of unsubstituted alkyl acrylate so that weight proportions are 3:1:1. The unsubstituted alkyl acrylates used are ethyl acrylate (giving approximate molar proportions of 2:3:4 and octadecyl acrylate (approximate molar proportions 2:3:1.2). The procedures are those used in Example 20 above and the polymers are applied to resin-treated tan steep twill as there described. Characterization of the polymers and of the finished fabric are summarized below. In each case the polymer provides about 0.12% of fluorine on the finished fabric.

| | Ethyl acrylate copolymer | Octadecyl acrylate copolymer |
|---|---|---|
| Percent uptake at 23° C.: | | |
| Water | 2.7 | 2.4 |
| Methanol | 23.9 | 10.4 |
| Cyclohexane | 3.2 | 37.0 |
| Contact angles in air at 23° C.: | | |
| Initial: | | |
| Water | 111 | 110 |
| Hexadecane | 70 | 75 |
| After wetting and drying: | | |
| Water | 110 | 110 |
| Hexadecane | 64 | 64 |
| Hexadecane under water | 120 | 120 |
| Ratings, initial: | | |
| Oil | 90 | 95 |
| Spray | 70 | 75 |
| After 5 launderings: Oil | 80 | 70 |
| Cleanability: | | |
| Mineral oil | 4.5 | 2.5 |
| Hair tonic | 4 | 3 |

It will be seen that the presence of octadecyl groups in the second copolymer creates internal oleophilicity so that the copolymer is not cleanable even at the same overall composition as the former. Surface oleophilicity of the second copolymer is relatively high.

EXAMPLE 22

This example illustrates a hybrid copolymer in which fluoroaliphatic groups are branched as the result of the use of 1,3 bis(N-methylfluorooctanesulfonamido)propanol-2 as a preformed "F" segment and polyethylene glycol of molecular weight about 600 is uesd to provide preformed "H" segments. The segments are joined by the use of toluene diisocyanate to form a tetraurethane.

A flask is charged with 54.1 g. of the above substituted propanol and 400 ml. of toluene. The charge is heated and toluene distilled to remove water. To the flask are then added 0.35 g. of phenyl mercuric acetate as catalyst and 8.7 g. of toluene diisocyanate and the refluxing solution is stirred for four hours. To the solution is added 15.6 g. of the polyethylene glycol and heating and stirring are continued for a further 2 hours. The copolymer precipitates when the reaction mixture is cooled. It is separated, and dried under vacuum at 45° C. It absorbs 14.3% of water, 13.8% of methanol and 1.7% of cyclohexane. Contact angles in air initially are 112° for water and 72° for hexadecane and, after wetting and drying are 112° for water and 67° for hexadecane. The angle for hexadecane under water is 97°.

The copolymer is padded onto the resin-treated tan steep twill of the above examples to 0.4% by weight and the finished fabric is rated. Initially the oil rating is 130 and spray rating 60. After 5 launderings and drying the oil rating is 100. Cleanability to both mineral oil and hair tonic is initially 4 and after 5 launderings ratings are respectively 5 and 3.5.

EXAMPLE 23

A hybrid copolymer having single terminal fluoroaliphatic groups is prepared by essentially the reaction used in Example 22 using N-methylperfluorooctanesulfonamidoethanol, polyethyleneglycol of molecular weight 400 and toluene diisocyanate. The copolymer precipitates and is dried as above. It absorbs 21.9% of water, 23.8% methanol and 0.7% cyclohexane. Contact angles in air initially are 101° for water 55° for hexadecane and are the same after wetting and drying. The angle for hexadecane under water is 110°.

The copolymer is padded onto resin-treated tan steep twill as in Example 22 and the finished fabric rated. Initially the oil rating is 110 and spray rating 50, after 5 launderings and drying the oil rating is 80. Cleanability to mineral oil is 4 initially and after 5 launderings.

EXAMPLE 24

This example illustrates the preparation of hybrid copolymers by copolymerizing (A) monomers which contain "F" segments, i.e., containing two or more fluoroaliphatic groups, and (B) monomers which contain single hydrophilic groups.

Prepolymers containing segments of fluoroaliphatic groups are prepared by polymerizing N-methylperfluorooctanesulfonamidoethyl acrylate (67.1 parts) in the presence of 2.86 parts of 2-mercaptoethanol as chain-terminater using 0.525 part of azobisisobutyronitrile as initiator in 163 parts of benzotrifluoride by agitating at 70° C. for 16 hours. The hydroxyterminated prepolymer is recovered by partial distillation of solvent followed by precipitation in methanol and washing with boiling methanol.

After drying, the prepolymer is converted to the methacrylate by reaction with excess methacrylic anhydride in benzotrifluoride in the presence of a trace of phenothiazine as antioxidant and inhibitor. The prepolymeric monomer, containing an average of three pendent fluoroaliphatic groups, is precipitated in methanol and dried.

Hybrid copolymers designated by Roman numerals (I), (II) and (III) are prepared from the above prepolymer methacrylate and monomers containing hydrophilic groups in a 60/40 parts by weight proportion respectively using 0.75 part azobisisobutyronitrile as initiator in the solvents indicated below by agitation for 16 hours at 70° C.

(I) Methacrylic acid (400 parts 1:1 benzotrifluoride: dimethylformamide).

(II) Hydroxypropyl methacrylate (300 parts benzotrifluoride).

(III) Hydroxypropyl acrylate (300 parts tetrahydrofuran).

The hybrid copolymers themselves and as treatments on a 50/50 forest green polyester/cotton steep twill are evaluated using above procedures. The results are tabulated as follows:

|  | I | II | III |
|---|---|---|---|
| Percent uptake at 23° C.: | | | |
| Methanol | 36.6 | 58.6 | 85.5 |
| Cyclohexane | 2.4 | 0.4 | 0.5 |
| Contact angles in air at 23° C.: | | | |
| Initial: | | | |
| Water | | 110 | 108 |
| Hexadecane | | 75 | 75 |
| After wetting and drying: | | | |
| Water | | 110 | 108 |
| Hexadecane | | 75 | 75 |
| Hexadecane under water | | 123 | 135 |
| Ratings, initial: | | | |
| Oil | | 95 | 130 | 120 |
| Spray | | 60 | 60 | 60 |
| Ratings after 5 launderings: Oil | | 60 | 100 | 110 |
| Cleanability: | | | |
| Initial: | | | |
| Mineral oil | 4.5 | 4.5 | 4.5 |
| Hair tonic | 3.5 | 3 | 4.5 |
| After 5 launderings: | | | |
| Mineral oil | | 4 | 4.5 |
| Hair tonic | | 3 | 3.5 |

What is claimed is:

1. A process for rendering a fabric durably oil and water repellent and additionally durably launderable for the removal of stains, characterized by the steps of applying to and drying on said fabric by convenient means reversibly autoadaptable segmented hybrid copolymer having a maximum glass temperature below about 130° C. comprising a balance of the following:
   (I) one or more "H" segments containing an average of more than two water-solvatable polar groups and substantially free from fluorinated aliphatic pendent groups of at least 3 carbon atoms terminated by trifluoromethyl groups, and
   (II) one or more "F" segments substantially free from water-solvatable polar groups and containing an average of at least two fluoroaliphatic pendent groups terminated by trifluoromethyl groups, which contain at least 3 and not more than 20 fully fluorinated carbon atoms and provide in the copolymer at least 1% bound fluorine, the intraconnecting structure of said "F" segments being substantially free of fluorine and the "F" segments being non-glassy and amorphous at a temperature not higher than 130° C.,
said copolymer being internally oleophobic and substantially water insoluble after application to said fabric.

2. A process according to claim 1 wherein the fabric is additionally provided with crease-resistance characteristics.

3. A process according to claim 1 wherein the fabric is composed essentially of natural fibers.

4. A process according to claim 1 wherein the fabric is a blend of natural and synthetic fibers.

5. A process according to claim 1 wherein the fabric is composed essentially of synthetic fibers.

6. The process according to claim 1 wherein the segmented hybrid copolymer is further characterized by displaying a surface developing an instantaneous contact angle of 70° or more with water in air and being hydratable and by developing a contact angle iwth cyclohexane of greater than 50° in air and greater than 90° in water.

7. A process for rendering a fabric durably oil and water repellent and additionally durably launderable for the removal of stains, characterized by the steps of applying to and drying on said fabric by convenient means reversibly autoadaptable segmented hybrid copolymer having a maximum glass temperature below about 130° C. comprising a balance of the following:
   (I) one or more "H" segments containing an average of more than two water-solvatable polar groups and substantially free from fluorinated aliphatic pendent groups of at least 3 carbon atoms terminated by trifluoromethyl groups, and in which the structural units containing the water-solvatable polar groups constitute at least 25% by weight of the "H" segments, and
   (II) one or more "F" segments substantially free from water-solvatable polar groups and containing an average of at least two fluoroaliphatic pendent groups, terminated by trifluoromethyl groups, which contain at least 3 and not more than 20 fully fluorinated carbon atoms and provide in the copolymer at least 1% fluorine, the intraconnecting structure of said "F" segments being substantially free of fluorine and the "F" segments being non-glassy and amorphous at a temperature not higher than 99° C.,
said copolymer having not more than 50% by weight of interconnecting structure linking the "H" and "F" segments, and being internally oleophobic and substantially water insoluble when applied to a fabric and being reversibly autoadaptable on said fabric at a temperature between 50° and 130 C. to environmental conditions encountered during a laundering-drying cycle whereby it repeatedly displays an oleophobic surface in air and a hydrophilic surface with net oleophobicity in water.

8. A process for rendering a fabric durably oil and water repellent and additionally durably launderable for the removal of stains, characterized by the steps of applying to and drying on said fabric by convenient means reversibly autoadaptable segmented hybrid copolymer having a maximum glass temperature below about 130° C. comprising a balance of the following:
   (I) one or more "H" linear segments containing an average of more than two water-solvatable polar groups and a hetero atom selected from at least one of the group consisting of oxygen, sulfur and nitrogen, and substantially free from fluorinated aliphatic pendent groups of at least 3 carbon atoms terminated by trifluoromethyl groups, and in which the structural units containing the water-solvabable polar groups constitute at least 25% by weight of the "H" segments, and
   (II) one or more "F" segments substantially free from water-solvatable polar groups and containing an average of at least two fluoroaliphatic pendent groups terminated by trifluoromethyl groups, which contain at least 3 and not more than 20 fully fluorinated carbon atoms and provide in the copolymer at least 1% bound fluorine, the intraconnecting structure of said "F" segments being substantially free of fluorine and the "F" segments being non-glassy and amorphous at a temperature not higher than 130° C.,
said copolymer having not more than 50% by weight of interconnecting structure linking the "H" and "F" segments, and being internally oleophobic and substantially water insoluble when applied to a fabric and being reversibly autoadaptable on said fabric at a temperature between 50° and 130° C. to environmental conditions encountered during a laundering-drying cycle whereby it repeatedly displays an oleophobic surface in air and a hydrophilic surface with net oleophobicity in water.

9. The process according to claim 3 wherein the "H" segments contain polyalkylene oxide chains.

10. A textile material comprising (A) from 0 to 100% of cotton fibers and from 100 to 0% of polyester fibers treated with (B) a segmented hybrid copolymer comprising a balance of
   (I) one or more "H" segments containing an average of more than two water-solvatable polar groups and substantially free from fluorinated aliphatic pendent groups of at least 3 carbon atoms terminated by trifluoromethyl groups, and
   (II) one or more "F" segments substantially free from water-solvatable polar groups and containing an average of at least two fluoroaliphatic pendent groups terminated by trifluoromethyl groups, which contain at least 3 and not more than 20 fully fluorinated carbon atoms and provide in the copolymer at least 1% bound fluorine, the intraconnecting structure of said "F" segments being substantially free of fluorine and the "F" segments being non-glassy and amorphous at a temperature not higher than 130° C., said hybrid copolymer being internally oleophobic and substantially water insoluble and being in amount sufficient to give net oleophobicity in aqueous milieu.

11. A textile material according to claim 10 additionally comprising a resin finishing treatment.

References Cited

UNITED STATES PATENTS

| | | | |
|---|---|---|---|
| 3,068,187 | 12/1962 | Bolstad et al. | 117—139.5 A |
| 3,252,932 | 5/1966 | Bolstad et al. | 117—139.5 A |
| 3,256,231 | 6/1966 | Johnson et al. | 260—29.6 |
| 3,407,247 | 10/1968 | Reinhardt | 260—881 |

WILLIAM D. MARTIN, Primary Examiner

T. G. DAVIS, Assistant Examiner

U.S. Cl. X.R.

117—138.8 F, 138.8 N, 139.4, 139.5 A, 141, 142, 143 A

UNITED STATES PATENT OFFICE
CERTIFICATE OF CORRECTION

Page 1 of 2

Patent No. 3,728,151                    Dated April 17, 1973

Inventor(s) Sherman et al.

It is certified that error appears in the above-identified patent and that said Letters Patent are hereby corrected as shown below:

Column 1, line 20, "assumed" should read --assured--.
Column 2, line 22, "bady" should read --badly--.
Column 2, line 46, "depsite" should read --despite--.
Column 2, line 62, "Draper" should read --Drake--.
Column 3, line 3, omit the word "the" before --this invention--.
Column 3, line 19, "tread" should read --treated--.
Column 4, line 3, "variey" should read --variety--.
Column 5, line 30, "stands" should read --strands--.
Column 5, line 31, delete "and", first occurrence.
Column 6, line 21, "emergency" should read --emergence--.
Column 7, line 75, "founnd" should read --found--.
Column 8, line 58, "oil" should read --soil--.
Column 10, line 56, "need" should read --needed--.
Column 12, line 12, "Ca" should read --$C_8$--.
Column 13, line 12, "Preefrably" should read --Preferably--.
Column 15, line 9, "Considerability" should read --considerably--.
Column 15, line 10, "good" should read --poor--.
Column 16, line 62, "polymers" should read --polymer--.
Column 17, line 5, the formula "$C_8F_{17}SO_2N(C_2H_5)C_2H_4O_2CC(CH_3)\text{---}CH_2$" should read -- $C_8F_{17}SO_2N(C_2H_5)C_2H_4O_2CC(CH_3)=CH_2$ --.
Column 20, line 59, "of", second occurrence, should read --to--
Column 26, line 66, "(saponification equivalent 305)" should be inserted after the word "dibenzensulfonate"
Column 27, line 62, "1 ml." should read --100 ml.--.
Column 27, line 64, "120 g" should read -- 120 g. --.
Column 31, line 1, "reactorfitted" should read --reactor fitted --.
Column 32, line 46, "eve n" should read --even--.
Column 33, line 7, delete footnote.

UNITED STATES PATENT OFFICE
CERTIFICATE OF CORRECTION

Page 2 of 2

Patent No. 3,728,151　　　　　　　　Dated April 17, 1973

Inventor(s) Sherman et al.

It is certified that error appears in the above-identified patent and that said Letters Patent are hereby corrected as shown below:

Column 33, lines 44-46, the nos. under 0/100 should read -- 30, 58, 98 --.
Column 34, line 18, "alkylpolyalkylene-oxy" should read --alkylpolyalkyleneoxy--.
Column 34, line 26, "codenser" should read --condenser--.
Column 35, line 65, the No. "4" in last column should read -- 4.5 --.
Column 36, line 26, "N-methylperfluoroctanesulfonamidoethy" should read --N-methylperfluorooctanesulfonamidoethy--.
Column 37, line 18, "restrained" should read --restained--.

Column 39, line 58, "iwth" should read --with--.
Column 39, line 58, "cyclohexane" should read --hexadecane--.

Signed and sealed this 19th day of November 1974.

(SEAL)
Attest:

McCOY M. GIBSON JR.　　　　　　　　C. MARSHALL DANN
Attesting Officer　　　　　　　　　Commissioner of Patents